United States Patent
Zhang et al.

(10) Patent No.: US 11,889,100 B2
(45) Date of Patent: Jan. 30, 2024

(54) AFFINE MOTION VECTOR PREDICTION IN VIDEO CODING

(71) Applicant: QUALCOMM Incorporated, San Diego, CA (US)

(72) Inventors: Kai Zhang, San Diego, CA (US); Jianle Chen, San Diego, CA (US); Xiang Li, Los Gatos, CA (US); Hsiao-Chiang Chuang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 16/189,481

(22) Filed: Nov. 13, 2018

(65) Prior Publication Data

US 2019/0149838 A1    May 16, 2019

Related U.S. Application Data

(60) Provisional application No. 62/586,069, filed on Nov. 14, 2017.

(51) Int. Cl.
*H04N 19/52* (2014.01)
*H04N 19/176* (2014.01)
(Continued)

(52) U.S. Cl.
CPC ........... *H04N 19/52* (2014.11); *H04N 19/105* (2014.11); *H04N 19/176* (2014.11); *H04N 19/54* (2014.11); *H04N 19/573* (2014.11)

(58) Field of Classification Search
CPC ...... H04N 19/176; H04N 19/52; H04N 19/61; H04N 19/105; H04N 19/70; H04N 19/513;

(Continued)

(56) References Cited

U.S. PATENT DOCUMENTS

| | | | |
|---|---|---|---|
| 2013/0022119 A1* | 1/2013 | Chien | H04N 19/51 375/E7.123 |
| 2019/0028731 A1* | 1/2019 | Chuang | H04N 19/105 |
| 2019/0037231 A1* | 1/2019 | Ikai | H04N 19/513 |

FOREIGN PATENT DOCUMENTS

| | | |
|---|---|---|
| CN | 104661031 A | 5/2015 |
| CN | 105163116 A | 12/2015 |

(Continued)

OTHER PUBLICATIONS

Li Affine Coding.*

(Continued)

*Primary Examiner* — Farhan Mahmud
(74) *Attorney, Agent, or Firm* — Shumaker & Sieffert, PA

(57) ABSTRACT

A method and system of coding video data using affine motion compensation is described. A method may include receiving a current block of video data that is to be decoded using affine motion compensation, and constructing an affine motion vector predictor (MVP) list for one or more control points of the current block of video data, including adding a motion vector from a neighboring block of video data to the affine MVP list in the case that the motion vector has an associated reference picture that is the same as a target reference picture for the current block of video data. A video coder may determine motion vectors for the one or more control points using the affine MVP list, and code the current block of video data with the determined motion vectors for the one or more control points of the current block of video data.

40 Claims, 14 Drawing Sheets

(51) Int. Cl.
*H04N 19/105* (2014.01)
*H04N 19/54* (2014.01)
*H04N 19/573* (2014.01)

(58) Field of Classification Search
CPC .... H04N 19/46; H04N 19/159; H04N 19/593; H04N 19/44
See application file for complete search history.

(56) References Cited

FOREIGN PATENT DOCUMENTS

| CN | 105850133 A | 8/2016 |
|---|---|---|
| CN | 106331722 A | 1/2017 |
| WO | 2017084512 A1 | 5/2017 |
| WO | 2017130696 A1 | 8/2017 |
| WO | 2017148345 A1 | 9/2017 |

OTHER PUBLICATIONS

Chen (Huawei) H., et al., "CE4: Common Base for Affine Merge Mode (Test 4.2.1)", 12.JVET Meeting, Oct. 3, 2018-Oct. 12, 2018, Macao, CN (The Joint Video Exploration Team of ISO/IEC JTC1/SC29/WG11 and ITU-T SG.16), No. JVET-L0366, Sep. 25, 2018 (Sep. 25, 2018), XP030193874, pp. 1-3, Retrieved from the Internet: URL:http://phenix.int-evry.fr/jvet/doc_end_user/documents/12_Macao/wg11/JVET-L0366-v1.zipJVET-L0366.docx [retrieved on Sep. 25, 20185].

Chen J., et al., "JVET-G1001—Algorithm Description of Joint Exploration Test Model 7 (JEM7)", Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, IT, Aug. 19, 2017 (Aug. 19, 2017), 51 Pages, XP030150980, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18.

Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.

Fujibayashi, et al., "CE9 3.2d Simplified Motion vector prediction," JCTVC-D231, Joint Collaborative Team on Video Coding (JCT-VC) of ITU-T SG16 WP3 and ISO/IEC JTC1/SC29/WG11, 4th Meeting: Daegu, Korea, Jan. 20-28, 2011.

Huang H., et al., "Affine Skip and Direct Modes for Efficient Video Coding", ECSE Dept., Rensselaer Polytechnic Institute, Troy, NY, IEEE DOI:10.1109/VCIP 2012.6410841, USA, 2012.

International Search Report and Written Opinion—PCT/US2018/061085—ISA/EPO—dated Mar. 7, 2019.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Chen J., et al., "Algorithm Description of Joint Exploration Test Model 1," Joint Video Exploration Team (JVET) of ITU-T SG16 WP3 and ISO/IEC JTC1/SC29/WG11, 1nd Meeting: Geneva, CH, Oct. 19-21, 2015, JVET-A1001, 27 pp.

Flynn D., et al., "High Efficiency Video Coding (HEVC) Range Extensions text specification: Draft 6," (Joint 31 Collaborative Team on Video Coding of ITU-T SG. 16 WP 3 and ISO/IEC JTC1/SC29/WG11), 16th Meeting: San Jose, US, Jan. 9-17, 2014, Document: JCTVC-P1005_v1, 368 pages.

Wang., et al., "High Efficiency Video Coding (HEVC) Defect Report 2," Joint Collaboration Team of Video Coding, ITU-T SG 16 WP 3 and ISO/IEC JTC 1/SC 29/WG 11, 15th Meeting, Geneva, CH, Oct. 23-Nov. 1, 2013, Document: JCTVC-O1003_V2, 311 pages.

Sullivan G., et al., "Meeting Report of the Fifth Meeting of the Joint Collaborative Team on Video Coding (JCT-VC), Geneva, CH, Mar. 16-23, 2011", (Joint Collaborative Team on Video Coding of ISO/EPO IEC JTC1/SC29/WG11 and ITU-TSG.16), 5th JCT-VC Meeting, 96. MPEG Meeting, Mar. 16, 2011-Mar. 23, 2011, JCTVC-E600v3, pp. 1-211, Mar. 21, 2011, XP030009012.

Taiwan Search Report—TW107140476—TIPO—dated May 24, 2022.

* cited by examiner

AFFINE MOTION VECTOR PREDICTION IN VIDEO CODING

This application claims the benefit of U.S. Provisional Application No. 62/586,069, filed Nov. 14, 2017, the entire content of which is incorporated by reference herein.

TECHNICAL FIELD

This disclosure relates to devices, systems, and methods for video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the ITU-T H.265, High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques related to inter-picture prediction. More specifically, this disclosure describes techniques for motion vector coding for affine motion compensation in block-based video coding. The techniques of this disclosure include constructing an affine motion vector predictor list for use in coding the motion vectors of one or more control points of an affine motion model for a current block. A video coder (e.g., video encoder or video decoder) may construct the affine motion vector predictor list for a current block using motion vectors associated with neighboring blocks. The video coder may add a motion vector of a neighboring blocks to the affine motion vector predictor list if the motion vector points to a reference picture identical to the target reference picture. The target reference picture is the reference picture identified by the reference list and reference picture index signaled for the current block.

The techniques of this disclosure may be used with any of the existing video codecs, such as HEVC (High Efficiency Video Coding), or be an efficient coding tool in any future video coding standards, such as H.266/VVC (Versatile Video Coding).

In one example, this disclosure describes a method of video decoding, the method comprising receiving a current block of video data that is to be decoded using affine motion compensation, constructing an affine motion vector predictor (MVP) list for one or more control points of the current block of video data, including adding a motion vector from a neighboring block of video data to the affine MVP list in the case that the motion vector has an associated reference picture that is the same as a target reference picture for the current block of video data, determining motion vectors for the one or more control points using the affine MVP list, and decoding the current block of video data with the determined motion vectors for the one or more control points of the current block of video data.

In another example, this disclosure describes an apparatus configured to decode video data, the apparatus comprising a memory configured to store a current block of video data, and one or more processors in communication with the memory, the one or more processors configured to receive the current block of video data that is to be decoded using affine motion compensation construct an affine MVP list for one or more control points of the current block of video data, including adding a motion vector from a neighboring block of video data to the affine MVP list in the case that the motion vector has an associated reference picture that is the same as a target reference picture for the current block of video data, determine motion vectors for the one or more control points using the affine MVP list, and decode the current block of video data with the determined motion vectors for the one or more control points of the current block of video data.

In another example, this disclosure describes an apparatus configured to decode video data, the apparatus comprising means for receiving a current block of video data that is to be decoded using affine motion compensation, means for constructing an affine MVP list for one or more control points of the current block of video data, including adding a motion vector from a neighboring block of video data to the affine MVP list in the case that the motion vector has an associated reference picture that is the same as a target reference picture for the current block of video data, means for determining motion vectors for the one or more control points using the affine MVP list, and means for decoding the current block of video data with the determined motion vectors for the one or more control points of the current block of video data.

In another example, this disclosure describes an apparatus configured to encode video data, the apparatus comprising a memory configured to store a current block of video data, and one or more processors in communication with the memory, the one or more processors configured to receive the current block of video data that is to be encoded using affine motion compensation, construct an affine MVP list for one or more control points of the current block of video data, including adding a motion vector from a neighboring block of video data to the affine MVP list in the case that the motion vector has an associated reference picture that is the same as a target reference picture for the current block of video data, determine motion vectors for the one or more control points using the affine MVP list, and encode the current block of video data with the determined motion vectors for the one or more control points of the current block of video data.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
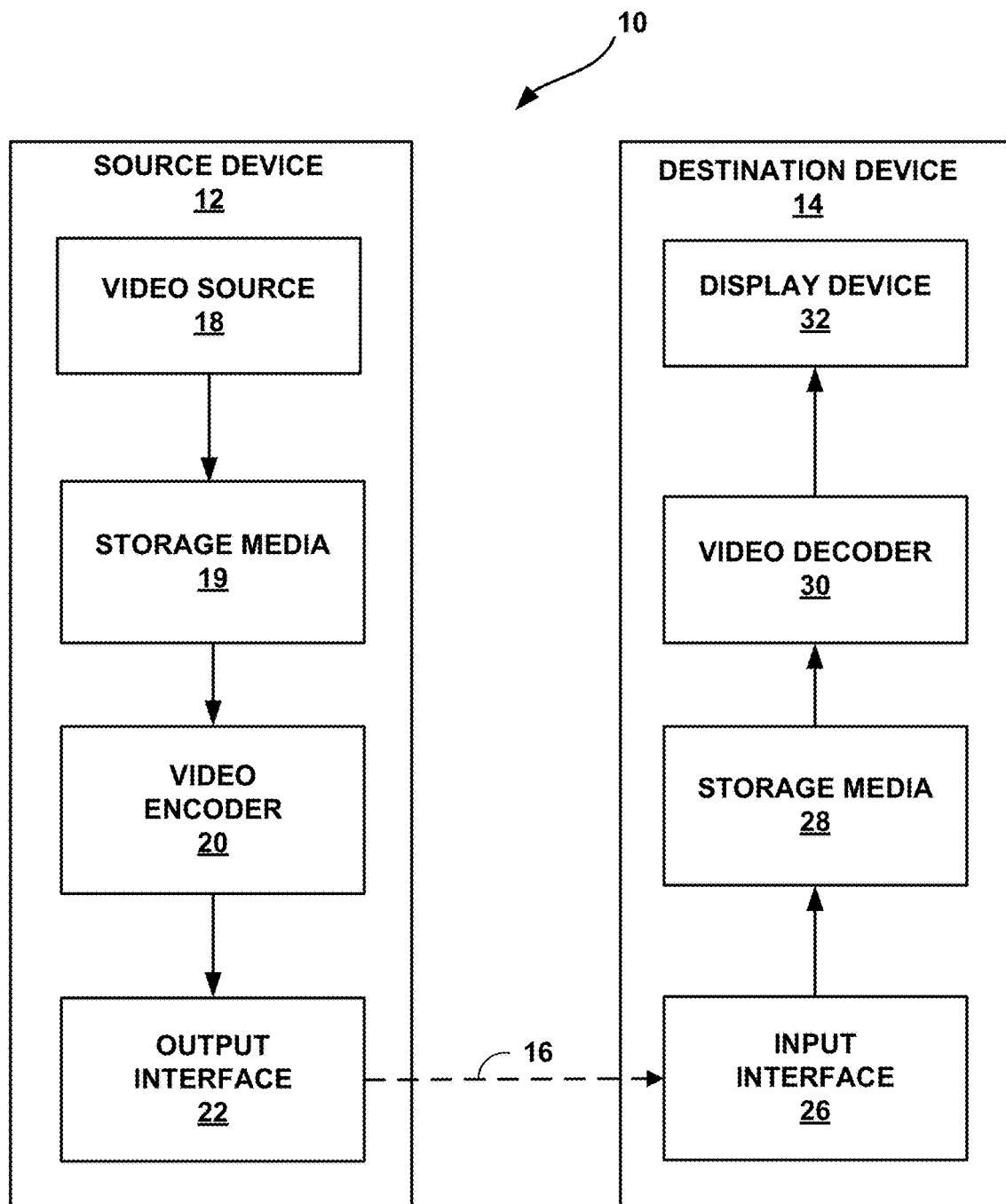
FIG. 1 is a block diagram illustrating an example video encoding and decoding system that may utilize one or more techniques described in this disclosure.

This disclosure describes techniques for affine motion vector prediction in video coding. The use of affine motion models has been proposed to provide further compression of video data. An affine motion model for a block of video data expresses a rotation of the block in a series of pictures. An affine motion model of a block can be determined based on motion vectors of control points of the block. In some implementations, the control points of the block are the top-left and top-right corners of the block. In other implementations, the control points of the block further include the bottom-left corner of the block. A video coder (e.g., a video encoder or a video decoder) may determine motion vectors of sub-blocks of the block based on the motion vectors of the control points of the block.

Two example techniques have been proposed for signaling the motion vectors of the control points of a block. The first technique is sometimes called the affine inter mode. The second technique is sometimes called the affine merge mode. In the affine inter mode, a video encoder generates an affine motion vector predictor (MVP) set candidate list for a current block. The affine MVP set candidate list is a list of affine MVP sets. Each affine MVP set is a set of MVPs corresponding to different control points of the current block. The video encoder signals an index that identifies to a video decoder a selected affine MVP set in the affine MVP set candidate list. Additionally, the video encoder signals a motion vector difference (MVD) for each of the control points of the current block. The motion vector of a control point may be equal to the MVD for the control point plus the motion vector predictor for control point in the selected affine MVP set. The video encoder also signals a reference index that identifies a reference picture which the video decoder is use with the current block. The video decoder generates the same affine MVP set candidate list and uses the signaled index to determine the selected affine MVP set. The video decoder may add the MVDs to motion vectors of the selected affine MVP set to determine the motion vector of the control points of the current block.

In the affine merge mode, a video encoder and a video decoder identify the same affine source block for a current block. The affine source block may be an affine-coded block that spatially neighbors the current block. The video encoder and video decoder extrapolate the motion vectors of the control points of the current block from the motion vectors of the control points of the affine source block. For instance, the video encoder and the video decoder may construct an affine motion model that describes motion vectors of locations within the current block. The affine motion model is defined by a set of affine parameters. The video encoder and the video decoder may determine the affine parameters based on the motion vectors of the control points of the current block. The video encoder and the video decoder may determine the motion vectors of the control points of the current block based on motion vectors of control points of the affine source block.

In some examples, techniques for constructing the affine MVP set candidate list may be inefficient. That is, some example techniques for constructing the affine MVP set candidate list may populate the list with candidates that may lead to sub-optimal video coding in terms of both coding rate and/or distortion. This disclosure describes techniques for more efficiently constructing an affine MVP set candidate list.

FIG. 1 is a block diagram illustrating an example video encoding and decoding system 10 that may utilize techniques of this disclosure for affine motion vector predictor list construction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, tablet computers, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (i.e., a device for decoding video data).

In the example of FIG. 1, source device 12 includes a video source 18, storage media 19 configured to store video data, a video encoder 20, and an output interface 22. Destination device 14 includes an input interface 26, a storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device. Although generally the techniques of this disclosure are performed by a video encoding device, the techniques may also be performed by a video encoder/decoder, typically referred to as a "CODEC." Source device 12 and destination device 14 are merely examples of such coding devices in which source device 12 generates coded video data for transmission to destination device 14. In some examples, source device 12 and destination device 14 may operate in a substantially symmetrical manner such that each of source device 12 and destination device 14 include video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 19) configured to store the video data. The techniques described in this disclosure may be applicable to video coding in general and may be applied to wireless and/or wired applications. In each case, the captured, pre-captured, or computer-generated video may be encoded by video encoder 20. Output interface 22 may output the encoded video information to a computer-readable medium 16.

Output interface 22 may comprise various types of components or devices. For example, output interface 22 may comprise a wireless transmitter, a modem, a wired networking component (e.g., an Ethernet card), or another physical component. In examples where output interface 22 comprises a wireless receiver, output interface 22 may be configured to receive data, such as the bitstream, modulated according to a cellular communication standard, such as 4G, 4G-LTE, LTE Advanced, 5G, and the like. In some examples where output interface 22 comprises a wireless receiver, output interface 22 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of output interface 22 may be integrated into circuitry of video encoder 20 and/or other components of source device 12. For example, video encoder 20 and output interface 22 may be parts of a system on a chip (SoC). The SoC may also include other components, such as a general-purpose microprocessor, a graphics processing unit, and so on.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques may be applied to video coding in support of any of a variety of multimedia applications, such as over-the-air television broadcasts, cable television transmissions, wired transmissions, satellite television transmissions, Internet streaming video transmissions, such as dynamic adaptive streaming over HTTP (DASH), digital video that is encoded onto a data storage medium, decoding of digital video stored on a data storage medium, or other applications or combinations of the above examples. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 20 of video encoder 20, which is also used by video decoder 30, that includes syntax elements that describe characteristics and/or processing of blocks and other coded units, e.g., groups of pictures (GOPs). Input interface 26 may comprise various types of components or devices. For example, input interface 26 may comprise a wireless receiver, a modem, a wired networking component (e.g., an Ethernet card), or another physical component. In examples where input interface 26 comprises a wireless receiver, input interface 26 may be configured to receive data, such as the bitstream, modulated according to a cellular communication standard, such as 4G, 4G-LTE, LTE Advanced, 5G, and the like. In some examples where input interface 26 comprises a wireless receiver, input interface 26 may be configured to receive data, such as the bitstream, modulated according to other wireless standards, such as an IEEE 802.11 specification, an IEEE 802.15 specification (e.g., ZigBee™), a Bluetooth™ standard, and the like. In some examples, circuitry of input interface 26 may be integrated into circuitry of video decoder 30 and/or other components of destination device 14. For example, video decoder 30 and input interface 26 may be parts of a SoC. The SoC may also include other components, such as a general-purpose microprocessor, a graphics processing unit, and so on.

Storage media 28 may be configured to store encoded video data, such as encoded video data (e.g., a bitstream) received by input interface 26. Display device 32 displays the decoded video data to a user and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In some examples, video encoder 20 and video decoder 30 may operate according to a video coding standard such as an existing or future standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions.

In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). Wang et al., "High Efficiency Video Coding (HEVC) Defect Report 2," Joint Collaborative Team on Video Coding (JCT-VC) of ITU-T SG 16 WP 3 and ISO/IEC JTC 1/SC 29/WG 11, $15^{th}$ Meeting, Geneva, CH, 23 Oct.-1 Nov. 2013, document JCTVC-O1003 v2 is an HEVC draft specification, referred to as HEVC WD hereinafter, available from http://phenix.int-evry.fr/jct/doc_end_user/documents/15_Geneva/wg11/JCTVC-O1003-v2.zip. The Range Extensions to HEVC, namely HEVC-Rext, is also being developed by the JCT-VC. Flynn et al., "High Efficiency Video Coding (HEVC) Range Extensions text specification: Draft 6", Joint Collaborative Team on Video Coding (JCT-VC) of ITU-T SG 16 WP 3 and ISO/IEC JTC 1/SC 29/WG 11, $16^{th}$ Meeting, San Jose, US, 9-17 Jan. 2014, document JCTVC-P1005_v1 is a recent Working Draft (WD) of Range extensions, referred to as RExt WD6 hereinafter, available from http://phenix.int-evry.fr/jct/doc_end_user/documents/16_San%20Jose/wg11/JCTVC-P1005-v1.zip. HEVC is also published as Recommendation ITU-T H.265, Series H: Audiovisual and Multimedia Systems, Infrastructure of audiovisual services—Coding of moving video, High efficiency video coding, December 2016.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). This joint effort is known as the Joint Video Exploration Team (JVET). There is evidence that significant improvements in coding efficiency can be obtained by exploiting the characteristics of video content, especially for the high-resolution content like 4K, with novel dedicated coding tools beyond H.265/HEVC.

The JVET first met during 19-21 Oct. 2015. And the latest version of reference software, i.e., Joint Exploration Model 7 (JEM7) could be downloaded from: https://jvet.hhi.fraunhofer.de/svn/svn_HMJEMSoftware/tags/HM-16.6-JEM-7.0/. This algorithm description for JEM7 could be referred to as J. Chen, E. Alshina, G. J. Sullivan, J.-R. Ohm, J. Boyce "Algorithm description of Joint Exploration Test Model 7 (JEM7)", JVET-G1001, Torino, July 2017.

An early draft for new video coding standard, referred to as the H.266/Versatile Video Coding (VVC) standard, is available in the document JVET-J1001 "Versatile Video Coding (Draft 1)" by Benjamin Bross, and its algorithm description is available in the document JVET-J1002 "Algorithm description for Versatile Video Coding and Test Model 1 (VTM 1)" by Jianle Chen and Elena Alshina. The techniques of this disclosure, however, are not limited to any particular coding standard. Test software for VVC is referred to as the VVC Test Model (VTM).

The techniques of this disclosure may be used in the context of advanced video codecs, such as extensions of HEVC or next generation video coding standards. While the techniques of this disclosure are generally described with reference to HEVC and next generation video coding standards (e.g., JEM/VVC/VTM), it should be understood that the techniques of this disclosure may be used in conjunction with any video coding techniques that affine motion vector prediction.

In one example of the disclosure, video encoder 20 and video decoder 30 may be configured to receive a current block of video data that is to be encoded/decoded using affine motion compensation, construct an affine motion vector predictor (MVP) list for one or more control points of the current block of video data, including adding a motion vector from a neighboring block of video data to the affine MVP list in the case that the motion vector has an associated reference picture that is the same as a target reference picture for the current block of video data, determine motion vectors for the one or more control points using the affine MVP list, and encode/decode the current block of video data with the determined motion vectors for the one or more control points of the current block of video data.

In HEVC and other video coding specifications, video data includes a series of pictures. Pictures may also be referred to as "frames." A picture may include one or more sample arrays. Each respective sample array of a picture may comprise an array of samples for a respective color component. In HEVC, a picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chroma samples. $S_{Cr}$ is a two-dimensional array of Cr chroma samples. In other instances, a picture may be monochrome and may only include an array of luma samples.

As part of encoding video data, video encoder 20 may encode pictures of the video data. In other words, video encoder 20 may generate encoded representations of the pictures of the video data. An encoded representation of a picture may be referred to herein as a "coded picture" or an "encoded picture."

To generate an encoded representation of a picture, video encoder 20 may encode blocks of the picture. Video encoder 20 may include, in a bitstream, an encoded representation of the video block. For example, to generate an encoded representation of a picture, video encoder 20 may partition each sample array of the picture into coding tree blocks (CTBs) and encode the CTBs. A CTB may be an N×N block of samples in a sample array of a picture. In the HEVC main profile, the size of a CTB can range from 16×16 to 64×64, although technically 8×8 CTB sizes can be supported.

A coding tree unit (CTU) of a picture may comprise one or more CTBs and may comprise syntax structures used to encode the samples of the one or more CTBs. For instance, each a CTU may comprise a CTB of luma samples, two corresponding CTBs of chroma samples, and syntax structures used to encode the samples of the CTBs. In monochrome pictures or pictures having three separate color planes, a CTU may comprise a single CTB and syntax structures used to encode the samples of the CTB. A CTU may also be referred to as a "tree block" or a "largest coding unit" (LCU). In this disclosure, a "syntax structure" may be defined as zero or more syntax elements present together in a bitstream in a specified order. In some codecs, an encoded picture is an encoded representation containing all CTUs of the picture.

To encode a CTU of a picture, video encoder 20 may partition the CTBs of the CTU into one or more coding blocks. A coding block is an N×N block of samples. In some codecs, to encode a CTU of a picture, video encoder 20 may recursively perform quad-tree partitioning on the coding tree blocks of a CTU to partition the CTBs into coding blocks, hence the name "coding tree units." A coding unit (CU) may comprise one or more coding blocks and syntax structures used to encode samples of the one or more coding blocks. For example, a CU may comprise a coding block of luma samples and two corresponding coding blocks of chroma samples of a picture that has a luma sample array, a Cb sample array, and a Cr sample array, and syntax structures used to encode the samples of the coding blocks. In monochrome pictures or pictures having three separate color planes, a CU may comprise a single coding block and syntax structures used to code the samples of the coding block.

Furthermore, video encoder 20 may encode CUs of a picture of the video data. In some codecs, as part of encoding a CU, video encoder 20 may partition a coding block of the CU into one or more prediction blocks. A prediction block is a rectangular (i.e., square or non-square) block of samples on which the same prediction is applied. A prediction unit (PU) of a CU may comprise one or more prediction blocks of a CU and syntax structures used to predict the one or more prediction blocks. For example, a PU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate a predictive block (e.g., a luma, Cb, and Cr predictive block) for a prediction block (e.g., luma, Cb, and Cr prediction block) of a CU. Video encoder 20 may use intra prediction or inter prediction to generate a predictive block. If video encoder 20 uses intra prediction to generate a predictive block, video encoder 20 may generate the predictive block based on decoded samples of the picture that includes the CU. If video encoder 20 uses inter prediction to generate a predictive block of a CU of a current picture, video encoder 20 may generate the predictive block of the CU based on decoded samples of a reference picture (i.e., a picture other than the current picture).

Thus, In HEVC, the largest coding unit in a slice is called a coding tree block (CTB). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into two prediction units (PUs) or become just one PU when further partition does not apply. When two PUs are present in one CU, they can be half size rectangles or two rectangle size with ¼ or ¾ size of the CU. When the CU is inter coded, one set of motion information is present for each PU. In addition, each PU is coded with a unique inter-prediction mode to derive the set of motion information. In HEVC, the smallest PU sizes are 8×4 and 4×8.

In HEVC and particular other codecs, video encoder 20 encodes a CU using only one prediction mode (i.e., intra prediction or inter prediction). Thus, in HEVC and particular other codecs, video encoder 20 may generate predictive blocks of a CU using intra prediction or video encoder 20 may generate predictive blocks of the CU using inter prediction. When video encoder 20 uses inter prediction to encode a CU, video encoder 20 may partition the CU into 2 or 4 PUs, or one PU corresponds to the entire CU. When two PUs are present in one CU, the two PUs can be half size rectangles or two rectangle sizes with ¼ or ¾ size of the CU. In HEVC, there are eight partition modes for a CU coded with inter prediction mode, i.e., PART_2N×2N, PART_2N× N, PART_N×2N, PART_N×N, PART_2N×nU, PART_2N× nD, PART_nL×2N and PART_nR×2N. When a CU is intra predicted, 2N×2N and N×N are the only permissible PU shapes, and within each PU a single intra prediction mode is coded (while chroma prediction mode is signaled at CU level).

To predict a CU, video encoder 20 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 20 may generate the prediction block using one or more motion vectors. Video encoder 20 may generally perform a motion search to identify a reference block that closely matches the CU, e.g., in terms of differences between the CU and the reference block. Video encoder 20 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 20 may predict the current CU using uni-directional prediction or bi-directional prediction.

JEM/VVC also provides an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. JEM/VVC provides sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

Video encoder 20 encodes data representing the prediction mode for a current block. For example, for inter-prediction modes, video encoder 20 may encode data representing which of the various available inter-prediction modes is used, as well as motion information for the corresponding mode. For uni-directional or bi-directional inter-prediction, for example, video encoder 20 may encode motion vectors using advanced motion vector prediction (AMVP) or merge mode. Video encoder 20 may use similar modes to encode motion vectors for affine motion compensation mode.

Video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the Cb residual block of a CU may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may decompose the residual blocks of a CU into one or more transform blocks. For instance, video encoder 20 may use quad-tree partitioning to decompose the residual blocks of a CU into one or more transform blocks. A transform block is a rectangular (e.g., square or non-square) block of samples on which the same transform is applied. A transform unit (TU) of a CU may comprise one or more transform blocks. For example, a TU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

In JEM7 and examples of VVC, rather than using the quadtree partitioning structure of HEVC described above, a quadtree binary tree (QTBT) partitioning structure may be used. The QTBT structure removes the concepts of multiple partitions types. That is, the QTBT structure removes the separation of the CU, PU, and TU concepts, and supports more flexibility for CU partition shapes. In the QTBT block structure, a CU can have either a square or rectangular shape. A QTBT structure of examples of JEM/VVC includes two levels: a first level partitioned according to quadtree partitioning, and a second level partitioned according to binary tree partitioning. A root node of the QTBT structure corresponds to a CTU. Leaf nodes of the binary trees correspond to coding units (CUs). In one example, a CU is first partition by a quadtree structure. The quadtree leaf nodes are further partitioned by a binary tree structure.

In some examples, there are two splitting types: symmetric horizontal splitting and symmetric vertical splitting. The binary tree leaf nodes are called CUs, and that segmentation (i.e., the CU) is used for prediction and transform processing without any further partitioning. This means that the CU, PU, and TU have the same block size in the QTBT coding block structure. In JEM/VVC, a CU sometimes includes coding blocks (CBs) of different color components. For example, one CU contains one luma CB and two chroma CBs in the case of P and B slices of the 4:2:0 chroma format and sometimes consists of a CB of a single component. For example, one CU contains only one luma CB or just two chroma CBs in the case of I slices.

In some examples, video encoder 20 and video decoder 30 may use a single QTBT structure to represent each of the luminance and chrominance components, while in other examples, video encoder 20 and video decoder 30 may use two or more QTBT structures, such as one QTBT structure for the luminance component and another QTBT structure for both chrominance components (or two QTBT structures for respective chrominance components).

Video encoder 20 and video decoder 30 may be configured to use quadtree partitioning per HEVC, QTBT partitioning according to examples of JEM/VVC, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

Video encoder 20 may apply one or more transforms a transform block of a TU to generate a coefficient block for the TU. A coefficient block may be a two-dimensional array of transform coefficients. A transform coefficient may be a scalar quantity. In some examples, the one or more transforms convert the transform block from a pixel domain to a frequency domain. Thus, in such examples, a transform coefficient may be a scalar quantity considered to be in a frequency domain. A transform coefficient level is an integer quantity representing a value associated with a particular 2-dimensional frequency index in a decoding process prior to scaling for computation of a transform coefficient value.

In some examples, video encoder 20 skips application of the transforms to the transform block. In such examples, video encoder 20 may treat residual sample values may be treated in the same way as transform coefficients. Thus, in examples where video encoder 20 skips application of the transforms, the following discussion of transform coefficients and coefficient blocks may be applicable to transform blocks of residual samples.

After generating a coefficient block, video encoder 20 may quantize the coefficient block. Quantization generally refers to a process in which transform coefficients are quantized to possibly reduce the amount of data used to represent the transform coefficients, providing further compression. In some examples, video encoder 20 skips quantization. After video encoder 20 quantizes a coefficient block, video encoder 20 may generate syntax elements indicating the quantized transform coefficients. Video encoder 20 may entropy encode one or more of the syntax elements indicating the quantized transform coefficients. For example, video encoder 20 may perform Context-Adaptive Binary Arithmetic Coding (CABAC) on the syntax elements indicating the quantized transform coefficients. Thus, an encoded block (e.g., an encoded CU) may include the entropy encoded syntax elements indicating the quantized transform coefficients.

Video encoder 20 may output a bitstream that includes encoded video data. In other words, video encoder 20 may output a bitstream that includes an encoded representation of video data. For example, the bitstream may comprise a sequence of bits that forms a representation of encoded pictures of the video data and associated data. In some examples, a representation of a coded picture may include encoded representations of blocks.

The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and encapsulates a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 20. As noted above, the bitstream may comprise an encoded representation of video data. Video decoder 30 may decode the bitstream to reconstruct pictures of the video data. As part of decoding the bitstream, video decoder 30 may parse the bitstream to obtain syntax elements from the bitstream. Video decoder 30 may reconstruct pictures of the video data based at least in part on the syntax elements obtained from the bitstream. The process to reconstruct pictures of the video data may be generally reciprocal to the process performed by video encoder 20 to encode the pictures. For instance, video decoder 30 may use inter prediction or intra prediction to generate one or more predictive blocks for each PU of the current CU may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. In some examples, video decoder 30 may reconstruct the coding blocks of the current CU by adding the samples of the predictive blocks for PUs of the current CU to corresponding decoded samples of the transform blocks of the TUs of the current CU. By reconstructing the coding blocks for each CU of a picture, video decoder 30 may reconstruct the picture.

A slice of a picture may include an integer number of CTUs of the picture. The CTUs of a slice may be ordered consecutively in a scan order, such as a raster scan order. In HEVC, a slice is defined as an integer number of CTUs contained in one independent slice segment and all subsequent dependent slice segments (if any) that precede the next independent slice segment (if any) within the same access unit. Furthermore, in HEVC, a slice segment is defined as an integer number of coding tree units ordered consecutively in the tile scan and contained in a single NAL unit. A tile scan is a specific sequential ordering of CTBs partitioning a picture in which the CTBs are ordered consecutively in CTB raster scan in a tile, whereas tiles in a picture are ordered consecutively in a raster scan of the tiles of the picture. A tile is a rectangular region of CTBs within a particular tile column and a particular tile row in a picture. A slice segment header is a part of a coded slice segment containing the data elements pertaining to the first or all coding tree units represented in the slice segment. The term "slice header" applies to a slice segment header of the independent slice segment that is a current slice segment or the most recent independent slice segment that precedes a current dependent slice segment in decoding order.

Figure 2A:
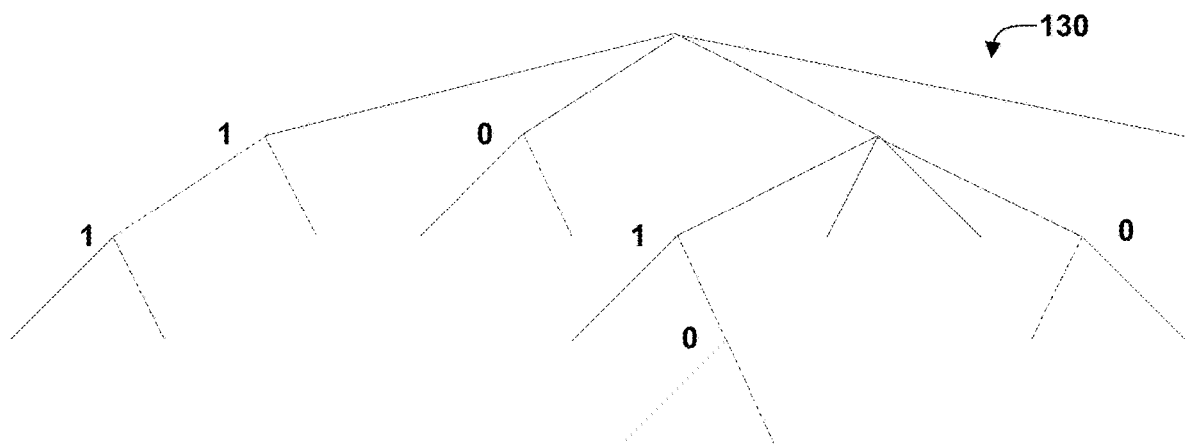
FIGS. 2A and 2B are conceptual diagrams illustrating an example quadtree binary tree (QTBT) structure, and a corresponding coding tree unit (CTU).
Figure 2B:
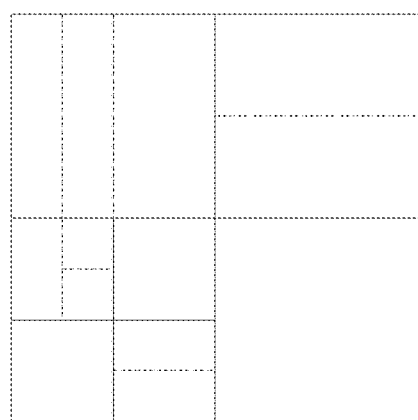

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example.

For the quadtree splitting, there is no need to indicate the splitting type, since quadtree nodes split a block horizontally and vertically into 4 sub-blocks with equal size. Accordingly, video encoder 20 may encode, and video decoder 30 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 20 may encode, and video decoder 30 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs and are further processed according to prediction and transform without further partitioning.

In H.265/HEVC, for each block, a set of motion information can be available. A set of motion information contains motion information for forward and backward prediction directions. Here forward and backward prediction directions are two prediction directions of a bi-directional prediction mode and the terms "forward" and "backward" do not necessarily have a geometry meaning. Instead, the terms "forward' and "backward" correspond to reference picture list 0 (RefPicList0) and reference picture list 1 (RefPicList1), respectively, of a current picture. When only one reference picture list is available for a picture or slice, only RefPicList0 is available and the motion information of each block of a slice is always forward.

For each prediction direction, the motion information includes a reference index and a motion vector. In some cases, for simplicity, a motion vector itself may be referred in a way that it is assumed that it has an associated reference index. A reference index is used to identify a reference picture in the current reference picture list (e.g., a first reference picture list (RefPicList0) or a second reference picture list (RefPicList1)). A motion vector has a horizontal (x) and a vertical component (y) that indicates the displacement between the current block and a predictive block.

Picture order count (POC) is widely used in video coding standards to identify a display order of a picture. Although there are cases two pictures within one coded video sequence may have the same POC value, it typically does not happen within a coded video sequence. When multiple coded video sequences are present in a bitstream, pictures with a same value of POC may be closer to each other in terms of decoding order. POC values of pictures are typically used for reference picture list construction, derivation of reference picture set as in HEVC and motion vector scaling.

As described above, in HEVC, the largest coding unit in a slice is called a coding tree block (CTB). A CTB contains a quad-tree the nodes of which are coding units. The size of a CTB can be ranges from 16×16 to 64×64 in the HEVC main profile (although technically 8×8 CTB sizes can be supported). A coding unit (CU) could be the same size of a CTB although and as small as 8×8. Each coding unit is coded with one mode. When a CU is inter coded, it may be further partitioned into two prediction units (PUs) or become just one PU when further partition doesn't apply. When two PUs are present in one CU, they can be half size rectangles or two rectangle size with ¼ or ¾ size of the CU.

When the CU is inter coded, one set of motion information is present for each PU. In addition, each PU is coded with a unique inter-prediction mode to derive the set of motion information. In HEVC, the smallest PU sizes are 8×4 and 4×8.

A video coder (e.g., video encoder 20 and video decoder 30) may perform uni-directional inter prediction or bi-directional inter prediction for a current block (e.g., a CU or PU). When performing uni-directional inter prediction for the current block, the video coder uses a motion vector to determine a location in a reference picture. The video coder may then generate a predictive block for the current block. The predictive block may comprise a block of samples in the reference picture at the location indicated by the motion vector, or a block of samples interpolated from samples of the reference picture. When performing bi-directional inter prediction, the video coder may perform this process with a second reference picture and a second motion vector, thereby generating a second predictive block for the current block. In bi-directional inter prediction, the predictive blocks generated from single reference pictures may be referred to herein as preliminary predictive blocks. Furthermore, in bi-directional inter prediction, the video coder may generate, based on the two preliminary blocks, a final predictive block for the current block. In some examples, the video coder may generate the final predictive block such that each sample in the final predictive block is a weighted average of corresponding samples in the preliminary predictive blocks.

To support inter prediction in a picture, a video coder (e.g., video encoder 20 and video decoder 30) generates two reference picture lists for the current picture. The reference picture lists for the current picture include reference pictures that are available for use in performing inter prediction of blocks in the current picture. The two reference picture lists are commonly referred to as List 0 and List 1 (also referred to as RefPicList0 and RefPicList1). In one example, each reference picture in List 0 for current picture occurs prior to the current picture in output order. In this example, each reference picture in List 1 for the current picture occurs after the current picture in output order. Hence, use of a reference picture in List 0 may be considered a first inter prediction direction and use of a reference picture in List 1 may be considered a second inter prediction direction. Video encoder 20 and video decoder 30 generate List 0 for the current picture with reference pictures in the same order. Likewise, video encoder 20 and video decoder 30 generate List 1 for the current picture with reference pictures in the same order. Thus, video encoder 20 may indicate to video decoder 30 a reference picture in a reference picture list by signaling a reference index that indicates a location in the reference picture list of the reference picture.

The HEVC standard includes multiple inter prediction modes, including merge mode (skip mode is considered as a special case of merge) and advanced motion vector prediction (AMVP) mode. In either AMVP or merge mode, a motion vector (MV) candidate list is maintained for multiple motion vector predictors. The motion vector(s), as well as reference indices in the merge mode, of the current PU are determine by taking one candidate from the MV candidate list. The MV candidate list contains up to 5 candidates for the merge mode and two candidates for the AMVP mode. A merge candidate may contain a set of motion information, e.g., motion vectors corresponding to one or more of the reference picture lists (e.g., list 0 and list 1) and the reference indices. A merge candidate is identified by a merge index, and video decoder 30 determines and uses the reference pictures for the prediction of the current blocks, as well as the associated motion vectors. However, under AMVP mode for each potential prediction direction from either list 0 or list 1, a reference index is explicitly signaled, together with a motion vector predictor (MVP) index to the MV candidate list since the AMVP candidate contains only a motion vector. The MVP index indicates the candidate in the MV candidate list. In AMVP mode, the predicted motion vectors can be further refined.

As can be seen above, a merge candidate corresponds to a full set of motion information (e.g., prediction direction, reference index, and motion vector) while an AMVP candidate contains just one motion vector for a specifically signaled prediction direction and reference index. The candidates for both modes are derived similarly from the same spatial and temporal neighboring blocks.

More specifically, in merge mode, video encoder 20 and video decoder 30 each generate merge motion vector (MV) candidate lists for a block (e.g., a PU or CU). The merge MV candidate list for the block includes one or more merge candidates, which may also be referred to as motion vector predictors (MVPs). In HEVC, the merge MV candidate list contains up to 5 merge candidates. Each respective merge candidate in the merge MV candidate list specifies one or more motion vector(s) and one or more reference index(es). For example, a merge candidate may specify a List 0 motion vector and/or a List 1 motion vector and may specify a List 0 reference index and/or a List 1 reference index. A List 0 motion vector is a motion vector that indicates a location in a reference picture in List 0. A List 1 motion vector is a motion vector that indicates a location in a reference picture in List 1. Video encoder 20 may signal a merge index that indicates a location in the merge MV candidate list of a selected merge candidate for the PU. Video decoder 30 may use the merge index to identify the selected merge candidate. Video decoder 30 may then use the motion vectors and reference indexes of the selected merge candidate as the motion vectors and reference indexes of the PU.

In AMVP mode, video encoder 20 generates a List 0 AMVP candidate list and/or a List 1 AMVP candidate list for a block (e.g., a PU or CU), either of which may be referred to as an AMVP candidate list. Video decoder 30 generates AMVP candidate lists matching the AMVP candidate lists generated by video encoder 20. In HEVC, an AMVP candidate list contains two AMVP candidates. Each respective AMVP candidate in a List 0 AMVP candidate list specifies a respective List 0 motion vector. Each respective AMVP candidate in a List 1 AMVP candidate list specifies a respective List 1 motion vector. In the AMVP mode, if the PU is uni-directionally inter predicted from List 0 or bi-directionally inter predicted, video encoder 20 signals a List 0 MVP index, a List 0 reference index, and a List 0 motion vector difference (MVD). The List 0 MVP index specifies a location of a selected AMVP candidate in the List 0 AMVP candidate list. The List 0 reference index specifies a location of a selected List 0 reference picture. The List 0 MVD specifies a difference between a List 0 motion vector of the PU and the List 0 motion vector specified by the selected AMVP candidate in the List 0 AMVP candidate list. Accordingly, video decoder 30 may use the List 0 MVP index and the List 0 MVD to determine the List 0 motion vector of the PU. Video decoder 30 may then determine a preliminary or final predictive block for the PU comprising samples corresponding to a location in the selected List 0 reference picture identified by the List 0 motion vector of the PU. Video encoder 20 may signal similar syntax elements for List 1 and video decoder 30 may use the syntax elements for List 1 in a similar way.

Figure 3A:
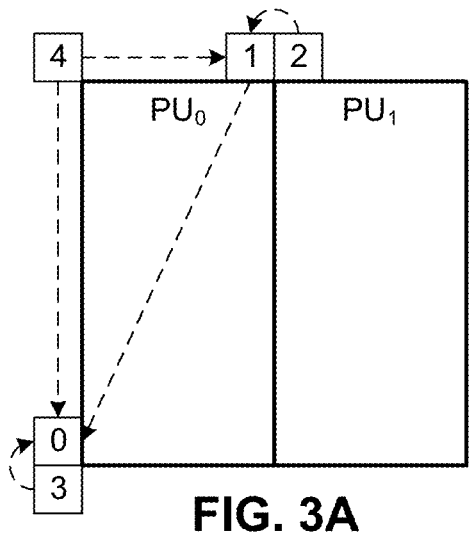
FIG. 3A illustrates spatial neighboring motion vector (MV) candidates for merge mode.
Figure 3B:
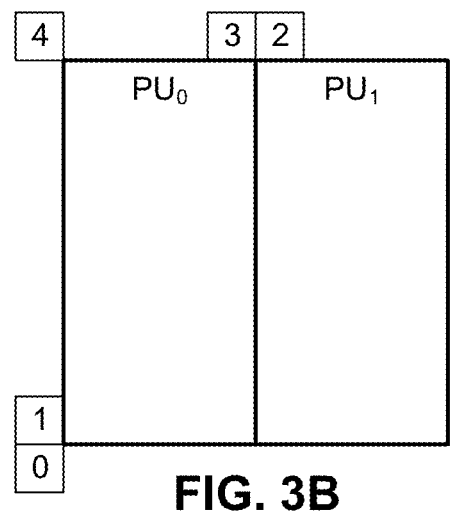
FIG. 3B illustrates spatial neighboring MV candidates for Advanced Motion Vector Prediction (AMVP) mode.

Spatial MV candidates are derived from the neighboring blocks shown in FIG. 3A and FIG. 3B, for a specific PU (PU$_0$), although the methods generating the candidates from the blocks may differ for merge and AMVP modes. FIG. 3A illustrates spatial neighboring MV candidates for merge mode. In merge mode, up to four spatial MV candidates can be derived with the order shown in FIG. 3A with numbers, and the order is the following: left (0), above (1), above-right (2), below-left (3), and above-left (4).

FIG. 3B illustrates spatial neighboring MV candidates for AMVP mode. In AMVP mode, the neighboring blocks are divided into two groups: a left group consisting of the block 0 and 1, and an above group consisting of the blocks 2, 3, and 4 as shown in FIG. 3B. For each group, the potential candidate in a neighboring block referring to the same reference picture as that indicated by the signaled reference index has the highest priority to be chosen to form a final candidate of the group. It is possible that all neighboring blocks don't contain a motion vector pointing to the same reference picture. Therefore, if such a candidate cannot be found, the first available candidate will be scaled to form the final candidate, thus the temporal distance differences can be compensated.

For example, as part of generating a List 0 AMVP candidate list, the video coder (e.g., video encoder 20 or video decoder 30) checks whether block 0 is predicted from List 0 and, if so, whether a List 0 reference picture of block 0 is the same as the current PU's List 0 reference picture. If block 0 is predicted from List 0 and the block 0's List 0 reference picture is the same as the current PU's List 0 reference picture, the video coder includes block 0's List 0 motion vector in the List 0 AMVP candidate list. If not, the video coder checks whether block 0 is predicted from List 1 and, if so, whether block 0's List 1 reference picture is the same as the current PU's List 0 reference picture. If block 0 is predicted from List 0 and block 0's List 1 reference picture is the same as the current PU's List 0 reference picture, the video coder includes block 0's List 1 motion vector in the List 0 AMVP candidate list. If block 0's List 1 reference picture is not the same as the current PU's List 0 reference picture, the video coder repeats this process with block 1 instead of block 0.

However, if block 1 is not predicted from List 1 or block 1's List 1 reference picture is not the same as the current PU's List 0 reference picture, the video coder determines whether block 0 is predicted from List 0 and, if so, determines whether block 0's List 0 reference picture and the current PU's List 0 reference picture are both long-term reference pictures or both short-term reference pictures. If block 0's List 0 reference picture and the current PU's List 0 reference picture are both long-term reference pictures or block 0's List 0 reference picture and the current PU's List 0 reference picture are both short-term reference pictures, the video coder may scale block 0's List 0 motion vector based on a temporal difference between block 0's List 0 reference picture and the current PU's List 0 reference picture. The video coder includes the scaled List 0 motion vector into the List 0 AMVP candidate list. If block 0's List 0 reference picture is a long-term reference picture and the current PU's List 0 reference picture is a short-term reference picture, or vice versa, the video coder determines whether block 0 is predicted from List 1 and, if so, determines whether block 0's List 1 reference picture and the current PU's List 0 reference picture are both long-term reference pictures or both short-term reference pictures. If block 0's List 1 reference picture and the current PU's List 0 reference picture are both long-term reference pictures or block 0's List 1 reference picture and the current PU's List 0 reference picture are both short-term reference pictures, the video coder may scale block 0's List 1 motion vector based on a temporal difference between block 0's List 1 reference picture and the current PU's List 0 reference picture. The video coder includes the scaled List 0 motion vector into the List 0 AMVP candidate list. If block 0's List 1 reference picture is a long-term reference picture and the current PU's List 0 reference picture is a short-term reference picture, or vice versa, the video coder repeats this process with block 1 instead of block 0.

The video coder may perform a similar process for blocks 2, 3, and 4 to include a second candidate in the current PU's List 0 AMVP candidate list. Additionally, the video coder may repeat this entire process, swapping references to List 0 with List 1 and reference to List 1 with List 0, to generate the current PU's List 1 AMVP candidate list.

Thus, in AVMP mode, the neighboring blocks are divided into two groups: left group consisting of the block 0 and 1, and above group consisting of the blocks 2, 3, and 4 as shown in FIG. 3B. For each group, the potential candidate in a neighboring block referring to the same reference picture as that indicated by the signaled reference index has the highest priority to be chosen to form a final candidate of the group. It is possible that all neighboring blocks do not contain a motion vector pointing to the same reference picture. Therefore, if such a candidate cannot be found, the first available candidate may be scaled to form the final candidate; thus, the temporal distance differences can be compensated.

A video coder may include a temporal motion vector predictor (TMVP) candidate, if enabled and available, into a merge MV candidate list after spatial motion vector candidates or an AMVP candidate list. For instance, in the case of AMVP, the video coder may include the TMVP candidate in the AMVP candidate list if the spatial neighboring blocks are unavailable (e.g., because the spatial neighboring blocks are outside a picture, slice, or tile boundary, because the spatial neighboring blocks are intra predicted, etc.). In merge mode, a TMVP candidate may specify List 0 and/or List 1 motion vectors of a temporal neighbor block. The reference indexes for the TMVP candidate in the merge mode are always set to 0. In AMVP mode, a TMVP candidate specifies either a List 0 motion vector of a temporal neighbor block or a List 1 motion vector of the temporal neighbor block. The temporal neighbor block is a block in a reference picture. The process of motion vector derivation for a TMVP candidate may be the same for both merge and AMVP modes.

As noted above, a video coder may scale a motion vector. When scaling a motion vector, it is assumed that the value of a motion vector is proportional to the distance of pictures in the presentation time. A motion vector associates two pictures, the reference picture, and the picture containing the motion vector (namely, the containing picture). When a motion vector is used to predict the other motion vector, the distance of the containing picture and the reference picture is calculated based on Picture Order Count (POC) values of the reference picture and the containing picture.

For a motion vector to be predicted, both its associated containing picture and reference picture may be different. Therefore, a new distance (based on POC) is calculated. The motion vector is scaled based on these two POC distances. For a spatial neighboring candidate, the containing pictures for the two motion vectors are the same, while the reference pictures are different. In HEVC, motion vector scaling applies to both TMVP and AMVP for spatial and temporal neighboring candidates.

Furthermore, in some implementations, if a MV candidate list (e.g., a merge MV candidate list or an AMVP candidate list) is not complete, a video coder may generate and insert artificial motion vector candidates at the end of the MV candidate list until the MV candidate list has the required number of candidates. In merge mode, there are two types of artificial MV candidates: combined candidates derived only for B-slices and zero candidates. A combined candidate specifies a combination of a List 0 motion vector from one merge candidate and a List 1 motion vector for a different merge candidate. Zero candidates are used for motion vector prediction only if the first type (i.e., combined candidates) does not provide enough artificial candidates. A zero candidate is a candidate that specifies a MV whose horizontal and vertical components are each equal to 0.

For each pair of candidates that are already in the candidate list and have necessary motion information, bi-directional combined motion vector candidates are derived by a combination of the motion vector of the first candidate referring to a picture in the list 0 and the motion vector of a second candidate referring to a picture in the list 1.

Additionally, a video coder may apply a pruning process for candidate insertion. Candidates from different blocks may happen to be the same, which may decrease the efficiency of a merge/AMVP candidate list. A pruning process is applied to solve this problem. The pruning process compares one candidate against the others in the current candidate list to avoid inserting identical candidate in certain extent. To reduce the complexity, only limited numbers of pruning process is applied instead of comparing each potential one with all the other existing ones.

Motion compensation in H.265/HEVC is used to generate a predictor for the current inter block (i.e., a block coded using inter prediction). Video encoder 20 and video decoder 30 may use a quarter pixel accuracy motion vector and may interpolate pixel values at fractional positions using neighboring integer pixel values for both luma and chroma components.

In some example video codec standards, only a translation motion model is applied for motion compensation prediction (MCP) (also called inter prediction). However, in the real world, there are many kinds of motion, e.g. zoom in/out, rotation, perspective motions and the other irregular motions. If only a translational motion model is applied for MCP in such test sequences with irregular motions, the use of such a translational motion mode will affect the prediction accuracy and may result in low coding efficiency. Video experts have tried to design algorithms to improve MCP for higher coding efficiency. In JEM, affine transform motion compensation prediction is applied to improve the coding efficiency. An affine merge mode and an affine inter mode are proposed to deal with affine motion models with four parameters, as follows:

$$\begin{cases} mv_x = ax + by + c \\ mv_y = dx + ey + f \end{cases} \quad (1)$$

In equation (1), $mv_x$ is a horizontal component of a motion vector for position (x, y) within the block, and $mv_y$ is a vertical component of the motion vector for position (x, y) within the block. In equation (1), a, b, c, d, e, and f are parameters. Note that in the affine motion model, different positions within the block have different motion vectors.

Figure 4:
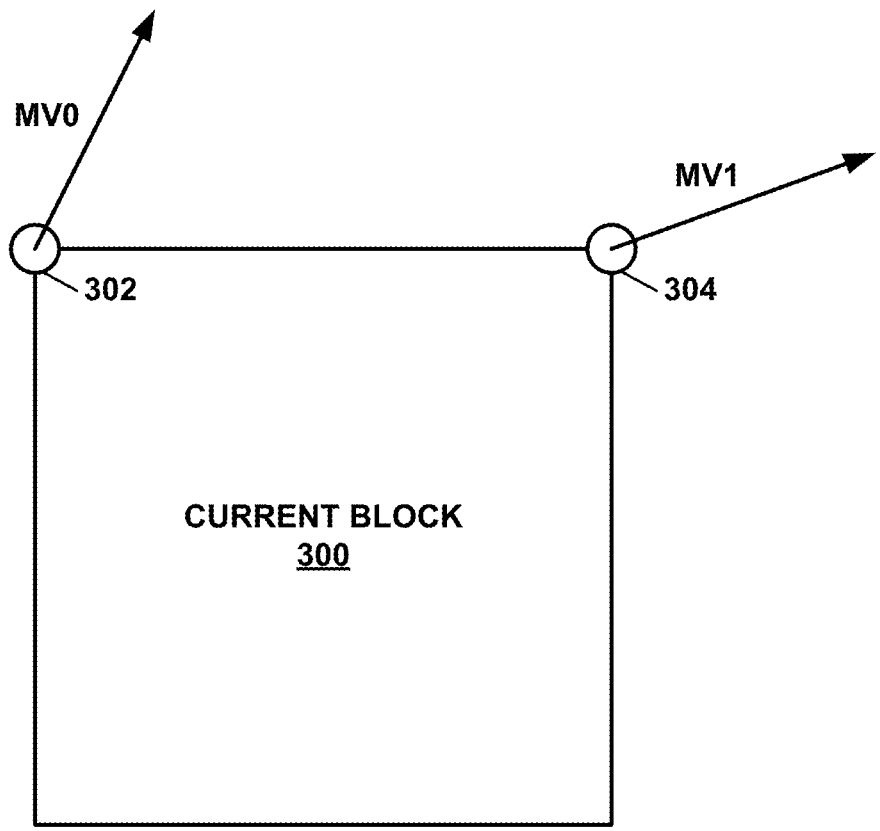
FIG. 4 is a conceptual diagram illustrating an example of two-point MV affine mode with four affine parameters.

The 4-parameter affine motion model may be represented by a motion vector of a top-left control point ($V_0$) and a motion vector of a top-right control point ($V_1$). FIG. 4 illustrates a simplified affine motion model for a current block 300. As shown in FIG. 4, an affine motion field of current block 300 is described by two control point motion vectors MV0 and MV1. MV0 is a control point motion vector for a top-left control point 302 of current block 300. MV1 is a control point motion vector for a top-right control point 304 of current block 300. As such, ($mvx_0$,$mvy_0$) is the control point motion vector on top left corner, and ($mvx_1$, $mvy_1$) is another control point motion vector on above right corner of current block 300, as shown in FIG. 4.

The motion vector field (MVF) of a block is described by the following equation:

$$\begin{cases} mv_x = \frac{(mv_{1x} - mv_{0x})}{w}x - \frac{(mv_{1y} - mv_{0y})}{w}y + mv_{0x} \\ mv_y = \frac{(mv_{1y} - mv_{0y})}{w}x + \frac{(mv_{1x} - mv_{0x})}{w}y + mv_{0y} \end{cases} \quad (2)$$

In equation (2), $mv_x$ is a horizontal component of a motion vector for a position (x, y) in a block; $mv_y$ is a vertical component of the motion vector for the position (x, y) in the block; ($mv_{0x}$, $mv_{0y}$) is a motion vector of the top-left corner control point (e.g., top-left control point 302); ($mv_{1x}$, $mv_{1y}$) is a motion vector of the top-right corner control point (e.g., top-right control point 304); and w is a width of the block. Thus, video encoder 20 and video decoder 30 may use equation (2) to "extrapolate" motion vectors for positions (x, y) based on motion vectors of control points of the block. In examples of the JEM software, the affine motion prediction is only applied to square blocks. As a natural extension, the affine motion prediction can also be applied to non-square blocks.

In some examples, to further simplify the motion compensation prediction, block-based affine transform prediction may be applied. Thus, rather than deriving motion vectors for each location in a block, a video coder (e.g., video encoder 20 and/or video decoder 30) may derive motion vectors for sub-blocks of the block. In JEM, the sub-blocks are 4×4 blocks. To derive a motion vector of a sub-block, the video coder may calculate the motion vector of a center sample of the sub-block according to equation (2). The video coder may then round the calculated motion vector to 1/16 fraction accuracy. The rounded motion vector may be referred to herein as a high-accuracy motion vector. Then, the video coder may apply motion compensation interpolation filters to generate predictions (i.e., predictive blocks) of each of the sub-blocks with derived motion vectors.

Figure 5:
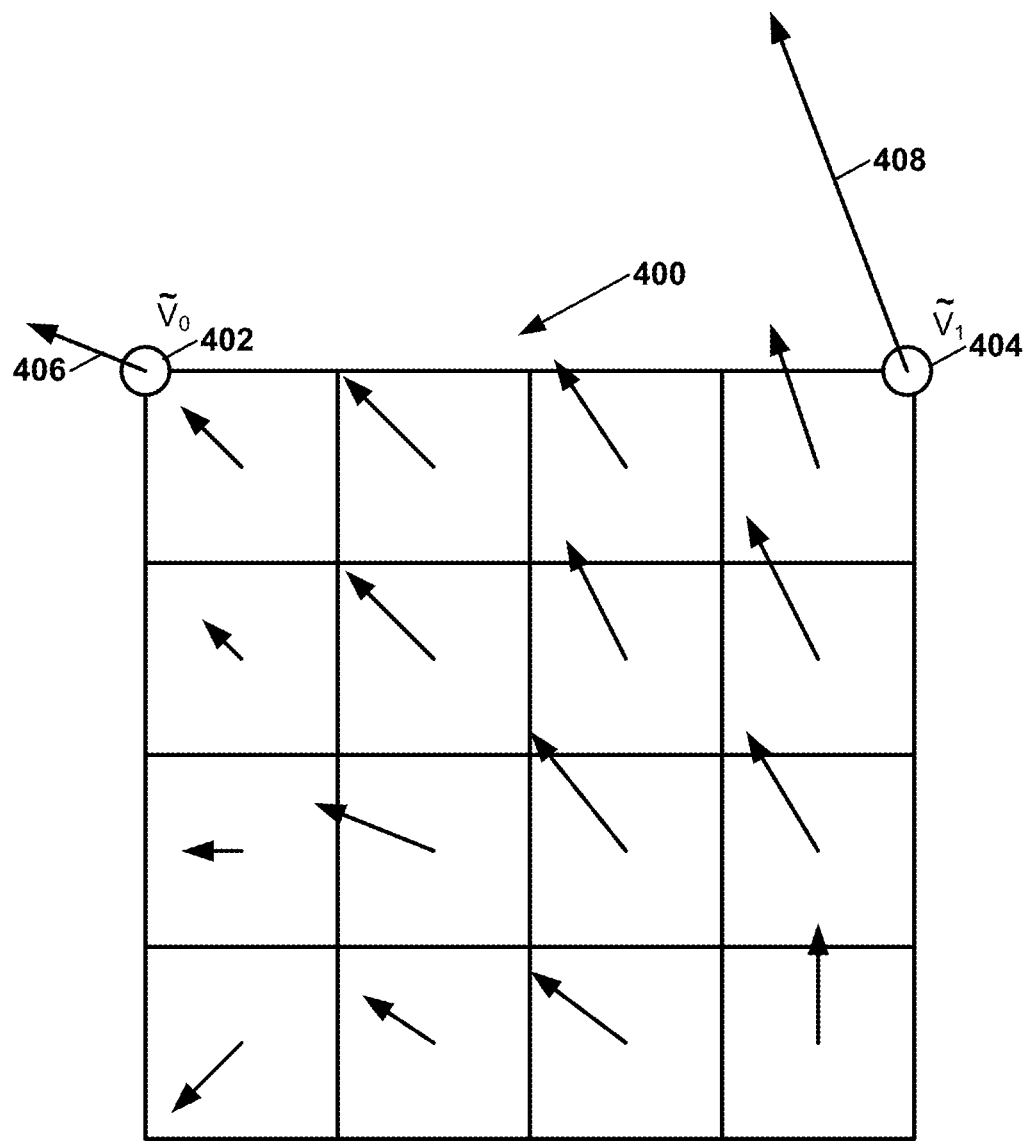
FIG. 5 illustrates an affine motion vector field (MVF) per sub-block.

FIG. 5 illustrates an example affine motion vector field (MVF) per sub-block. As shown in the example of FIG. 5, a current block 400 has a top-left control point 402 and a top-right control point 404. A video coder may calculate, based on a motion vector 406 for top-left control point 402 and a motion vector 408 for top-right control point 404, motion vectors for sub-blocks of current block 400. FIG. 5 shows the motion vectors of the sub-blocks as small arrows.

After MCP, the high-accuracy motion vector of each sub-block is rounded and saved as the same accuracy as the normal motion vector. In some examples, the rounding of the high-accuracy motion vector is only performed when the precision of the stored motion vectors is less then the high-accuracy motion vectors.

In one example, two affine motion modes are used in JEM: AF_INTER mode and AF_MERGE mode. In one example of JEM, the AF_INTER mode can be applied for CUs with both width and height larger than 8. An affine flag is signaled at the CU level in the bitstream to indicate whether AF_INTER mode is used. In the AF_INTER mode, video encoder 20 signals a List 0 reference index and/or a List 1 reference index for the current block to indicate a List 0 reference picture and/or a List 1 reference picture.

In the AF_INTER mode, video encoder 20 and video decoder 30 may each construct one or more candidate lists (i.e., affine MVP set candidate lists) for a current block. For instance, video encoder 20 and video decoder 30 may each construct a List 0 affine MVP set candidate list and/or a List 1 affine MVP set candidate list. Each of the affine MVP set candidate lists includes a respective set of affine MVP sets. In a 4-parameter affine motion model, an affine MVP set in a List 0 affine MVP set candidate list specifies two List 0 motion vectors (i.e., a motion vector pair). In a 4-parameter affine motion model, an affine MVP set in a List 1 affine MVP set candidate list specifies two List 1 motion vectors.

For every CU/PU whose size is equal to or larger than 16×16, AF_INTER mode can be applied as follows. If the current CU/PU is in AF_INTER mode, an affine flag in CU/PU level is signalled in the bitstream. An affine motion vector prediction (MVP) candidate list with two candidates as $\{(MVP^0_0, MVP^0_1), (MVP^1_0, MVP^1_1)\}$ is built. A rate-distortion optimization (RDO) cost is used to determine which whether $(MVP^0_0, MVP^0_1)$ or $(MVP^1_0, MVP^1_1)$ is selected as the affine motion vector prediction of the current CU/PU. If $(MVP^x_0, MVP^x_1)$ is selected, then $MV_0$ is coded with $MVP^x_0$ as the prediction and $MV_0$ is coded with $MVP^x_1$ as the prediction. The index to indicate the position of the selected candidate in the list is signalled for the current block in the bitstream.

Figure 6:
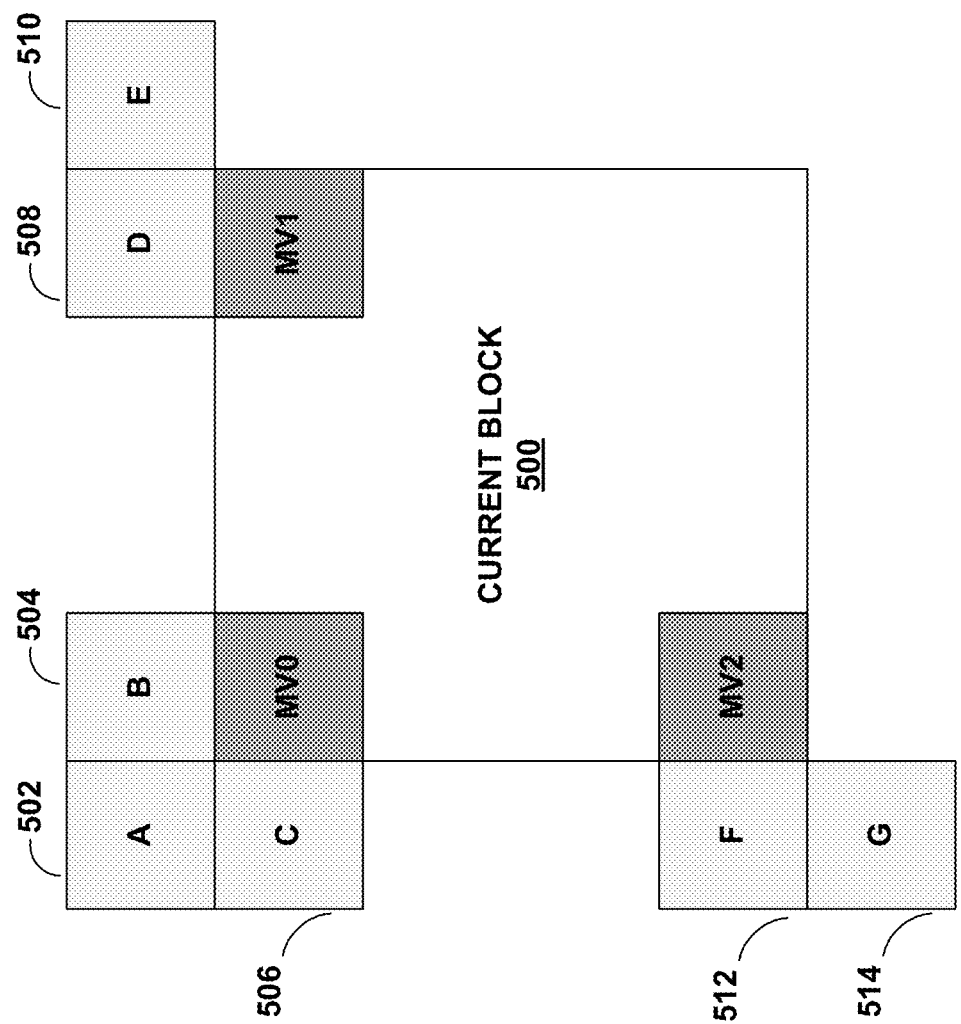
FIG. 6 is a block diagram illustrating a current block and neighboring blocks as used in the AF_INTER mode.

FIG. 6 is a block diagram illustrating current block 500 and neighboring blocks as used in the AF_INTER mode. In one example, neighboring blocks A-F shown in FIG. 6 may be used to construct an affine MVP candidate list for current block 500. In this example, the neighboring blocks may be divided into three groups: Group 0 (G0), Group 1 (G1), and Group 2 (G2). G0 includes left-above block 502 (A), first above block 504 (B), and first left block 506 (C). The G0 neighboring blocks may be used to determine a candidate for MV0 of the upper-left control point of current block 500. G1 includes second above block 508 (D) and right-above block 510 (E). The G1 neighboring blocks may be used to determine a candidate for MV1 of the upper-right control point of current block 500. G2 includes second left block 512 (G) and right-below block 514 (F). The G2 neighboring blocks may be used to determine a candidate for MV2 of the lower-left control point of current block 500.

The construction procedure of the affine MVP candidate list is as follows.
  Collect MVs from three groups (G0, G1, G2)
    G0: {MV-A, MV-B, MV-C}, G1: {MV-D, MV-E}, G2 {MV-F, MV-G}. Block A, B, C, D, E, F and G are shown in FIG. 6 for current block 500. MV-A is a motion vector associated with block A, MV-B is a motion vector associated with block B, etc.
    First take the MV referring to the target reference picture.
    Then the scaled MVs if not referring to the target reference picture.
  For a triplet (MV0, MV1, MV2) from G0, G1, G2, derive a MV2' from MV0 and MV1 with the affine model to obtain D (MV0, MV1, MV2)=|MV2-MV2'|
  Go through all triplets from G0, G1 and G2, find the triple (MV00, MV01, MV02) which produces the minimum D, then set $MVP^0_0$=MV00, $MVP^0_1$=MV01.
  If there are more than one available triplets, find the (MV10, MV11, MV12) which produces the second minimum D, then set $MVP^1_0$=MV10, $MVP^1_1$=MV11.
  If the candidates are not fulfilled, the MVP candidates for non-affine prediction block are derived for the current block. For example, the MVP candidates for non-affine prediction block are MVP_nonaff0 and MVP_nonaff1. If $(MVP^1_0, MVP^1_1)$ cannot be found from the triple search, then we set $MVP^1_0$=$MVP^1_1$=MVP_nonaff0.
After the MVP of the current affine CU/PU is determined, affine motion estimation is applied and the $(MV^0_0, MV^0_1)$ is found. Then the difference of $(MV^0_0, MV^0_1)$ and $(MVP^x_0, MVP^x_1)$ is coded in the bitstream.

Affine motion compensation prediction mentioned above is applied to generate the residues of the current CU/PU. Finally, the residues of the current CU/PU are transformed, quantized, and coded into the bit stream as the traditional procedure.

Figures 7A, 7B:
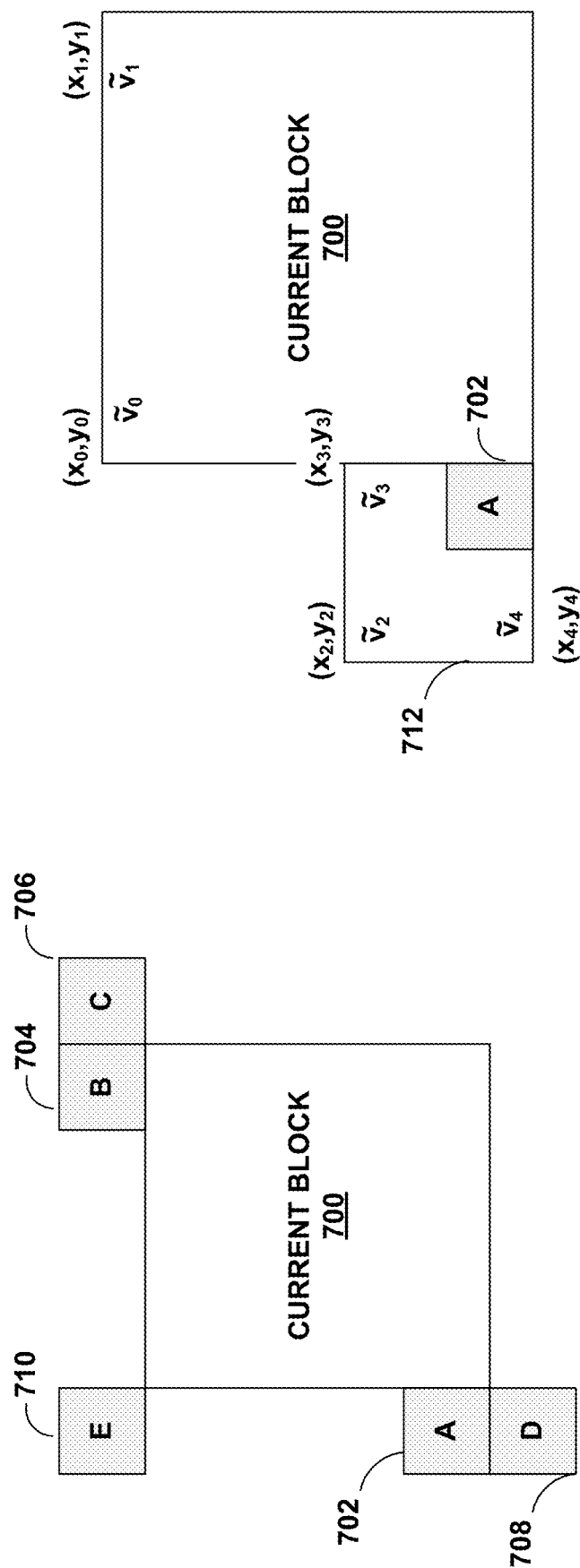
FIG. 7A shows neighboring blocks used when coding a current block in AF_MERGE mode.
FIG. 7B illustrates AF_MERGE when a neighbor left-bottom block is coded in affine mode.

When the current CU/PU is coded using AF_MERGE mode, video encoder 20 and video decoder 30 may obtain information related to the first block coded with affine mode from the valid neighbour reconstructed blocks. FIG. 7A shows neighboring blocks used when coding a current block 700 in AF_MERGE mode. The selection order for the candidate blocks relative to current block 700 is from left 702 (A), above 704 (B), above-right 706 (C), bottom-left 708 (D) to above-left 710 (E), as shown in FIG. 7A.

In one example, if the neighbour bottom-left block 702 (A) is coded in affine mode, as shown in FIG. 7B, video encoder 20 and video decoder 30 derives the motion vectors $mv_2$, $mv_3$ and $mv_4$ of the top-left corner, above-right corner and left-bottom corner of the CU/PU 712 which contains the bottom-left block 702 (A). Video encoder 20 and video decoder 30 calculates he motion vector $v_0$ of the top-left corner of the current CU/PU 712 according to $mv_2$, $mv_3$ and $mv_4$. Similarly, video encoder 20 and video decoder 30 calculates the motion vector $v_1$ of the above-right of the current CU/PU 712 based on $mv_2$, $mv_3$ and $mv_4$. After the control point motion vector (CPMV) of the current CU/PU $mv_0$ and $mv_1$ are determined, e.g., according to the simplified affine motion model defined in equation (2), video encoder 20 and video decoder 30 generates the MVF of the current block 700 (e.g., CU/PU). Then, video encoder 20 and video decoder 30 apply affine MCP, as described elsewhere in this disclosure. In order to identify whether the current block 700 (CU/PU) is coded with AF_MERGE mode, video encoder 20 may signal an affine flag in the bitstream to video decoder 30 when there is at least one neighbour block coded in affine mode. If no affine block neighbouring the current block 700 exists (e.g., the neighboring blocks shown in FIG. 7A), no affine flag is written in the bitstream.

In one example, for List X where X=0 and/or X=1, video encoder 20 and video decoder 30 may extrapolate the List X motion vector of a top-left control point of neighboring block 704 (B) to generate the List X motion vector of a top-left control point of current block 700, use a List X reference index of the top-left control point of neighboring block 704 (B) as the List X reference index of the top-left control point of current block 700, extrapolate the List X motion vector of a top-right control point of neighboring block 704 (B) to generate the List X motion vector of a top-right control point of current block 700, and use a List X reference index of the top-right control point of neighboring block 704 (B) as the List X reference index of the top-right control point of current block 700. In this example, video encoder 20 and video decoder 30 may use equation (2), above, to extrapolate a motion vector of a control point of neighboring block 704 (B) to determine a motion vector of a control point of current block 700, using an (x, y) position of the control point of current block 700 as x and y in equation (2).

In HEVC, context adaptive binary arithmetic coding (CABAC) is used to convert a symbol into a binarized value. This process is called binarization. Binarization enables efficient binary arithmetic coding via a unique mapping of non-binary syntax elements to a sequence of bits, which are called bins.

In the JEM2.0 reference software, for affine merge mode, only the affine flag is coded, and the merge index is inferred to be the first available neighboring affine model in the predefined checking order A-B-C-D-E (e.g., blocks 702, 704, 706, 708, and 710 in FIG. 7A). For the affine inter mode, two MVD syntaxes are coded for each prediction list indicating the motion vector difference between derived affine motion vector and predicted motion vector.

In U.S. patent application Ser. No. 15/587,044, filed May 4, 2017, a switchable affine motion prediction scheme is described. For a block coded using affine prediction, video encoder 20 and video decoder 30 may determine to use four-parameter affine model or six-parameter affine model adaptively. An affine model with 6 parameters is defined as:

$$\begin{cases} mv_x = ax + by + e \\ mv_y = cx + dy + f \end{cases} \quad (3)$$

Figure 8:
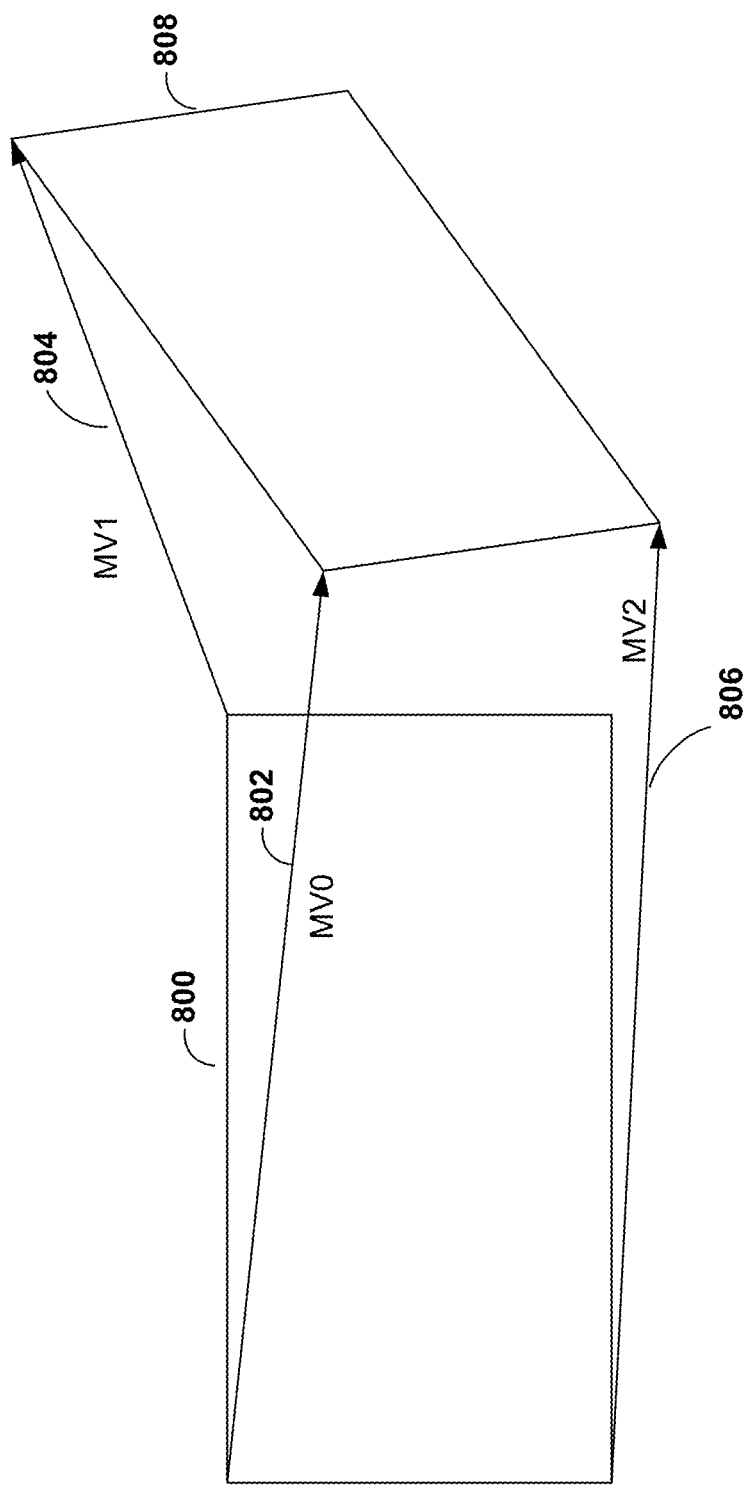
FIG. 8 is a conceptual diagram of an affine model with six parameters.

An affine model with 6 parameters has three control points. In other words, an affine model with 6 parameters is determined by three motion vectors, as shown in FIG. 8. MV0 802 is the first CPMV on top-left corner of current block 800, MV1 804 is the second CPMV on above-right corner of current block 800, and MV2 806 is the third control point motion vector on left-bottom corner of current block 800, as shown in FIG. 8. The affine model may describe the rotation of current block 800 into the position shown for reference block 808. The affine model built with the three motion vectors is calculated as:

$$\begin{cases} mv_x = \frac{(mv_{1x} - mv_{0x})}{w}x - \frac{(mv_{2x} - mv_{0x})}{h}y + mv_{0x} \\ mv_y = \frac{(mv_{1y} - mv_{0y})}{w}x + \frac{(mv_{2y} - mv_{0y})}{w}y + mv_{0y} \end{cases} \quad (4)$$

where w and h are the width and height of the block, respectively.

The techniques described above to derive the motion vectors of the top-left corner and the above-right corner of a current block can also be used to derive the MVPs for the top-left corner, the above-right corner and the below-left corner. Other examples are also described in U.S. patent application Ser. No. 15/725,052, filed Oct. 4, 2017. MVD1 can be predicted from MVD in the affine mode, as is described in U.S. Provisional Application No. 62/570,417, filed Oct. 10, 2017. For example, in AMVP mode, the final MV is calculated as an MVP plus a motion vector difference (MVD). The motion vector difference is determined by video encoder 20 as the difference between the actual motion vector for the block and the MVP. In affine mode, there may be more than one CPMV, and thus, there may be multiple MVDs. One MVD can be predicted from the other. In one example, the MVD of the top-left CPMV is selected to predict MVD of the other CPMVs.

This disclosure proposes several techniques to improve affine motion vector prediction. This disclosure describes techniques for constructing an affine MVP list more efficiently. The following itemized techniques may be applied individually. Alternatively, any combination of the following techniques may be applied together.

In a first example of the disclosure, video encoder 20 and/or video decoder 30 may be configured to use the motion vector of a neighboring block as the MVP for a control point of the current block with the affine mode only if it has one reference picture identical to the target reference picture. The target reference picture is the reference picture identified by the reference list and reference picture index signaled for the current block. One reference picture of the neighboring block is identical to the target reference picture if they are in the same reference list and with the same reference picture index. In another example, one reference picture of the neighboring block is identical to the target reference picture if they have the same picture order count (POC).

In a second example of the disclosure, video encoder 20 and/or video decoder 30 may be configured to derive one MVP0 for MV0 as follows:
1) Neighboring blocks A, B and C as shown in FIG. 6 are checked in a specified order. For example, the three blocks are checked in the order A, C and B. In another example, the three blocks are checked in the order A, B and C. In yet another example, the three blocks are checked in the order C, B and A.
2) When checking the neighboring blocks A, B and C in the specified order, video encoder 20 and/or video decoder 30 may be configured to choose the first available block which is inter-coded and has one reference picture, named RefX, identical to the target reference picture.
3) The motion vector of the chosen neighboring block which refers to RefX is output as MVP0. If no block satisfies the checking condition, MVP0 is marked as unavailable in this step.

In a third example of the disclosure, video encoder 20 and/or video decoder 30 may be configured to derive one MVP1 for MV1 as follows:
1) Neighboring blocks D and E as shown in FIG. 6 are checked in a specified order. For example, the two blocks are checked in the order D and E. In another example, the two blocks are checked in the order E and D.
2) When checking the neighboring blocks D and E in the specified order, video encoder 20 and/or video decoder 30 may be configured to choose the first available block which is inter-coded and has one reference picture, named RefX, identical to the target reference picture.
3) The motion vector of the chosen neighboring block which refers to RefX is output as MVP1. If no block satisfies the checking condition, MVP1 is marked as unavailable in this step.

In a fourth example of the disclosure, video encoder 20 and/or video decoder 30 may be configured to derive one MVP2 for MV2 as follows:
1) Neighboring blocks F and G as shown in FIG. 6 are checked in a specified order. For example, the two blocks are checked in the order F and G. In another example, the two blocks are checked in the order G and F.
2) When checking the neighboring blocks F and G in the specified order, video encoder 20 and/or video decoder 30 may be configured to choose the first available block which is inter-coded and has one reference picture, named RefX, identical to the target reference picture.
3) The motion vector of the chosen neighboring block which refers to RefX is output as MVP2. If no block satisfies the checking condition, MVP2 is marked as unavailable in this step.

In a fifth example of the disclosure, if MVP0 (second example) and MVP1 (third example) are available, but MVP2 (fourth example) is unavailable, then video encoder 20 and/or video decoder 30 may be configured to calculate MVP2 as:

$$\begin{cases} mvp_2^x = -\frac{(mvp_1^y - mvp_0^y)}{w}h + mvp_0^x \\ mvp_2^y = \frac{(mvp_1^x - mvp_0^x)}{w}h + mvp_0^y \end{cases}$$

where MVP2=($mvp_2^x$, $mvp_2^y$), MVP1=($mvp_1^x$, $mvp_1^y$) and MVP0=($mvp_0^x$, $mvp_0^y$), and w and h are the width and height of the current block, respectively. In another example, the division operation can be replaced by the shift operation. For example, $$\begin{cases} mvp_2^x = -\left(((mvp_1^y - mvp_0^y)h + \text{offset}) >> wb\right) + mvp_0^x \\ mvp_2^y = -\left(((mvp_1^x - mvp_0^x)h + \text{offset}) >> wb\right) + mvp_0^y \end{cases}$$

where w=$2^n$. offset is any integer, such as 0 or w/2. In another example, the division operation can be replaced by a lookup table.

In a sixth example of the disclosure, if MVP0 (second example) and MVP2 (fourth example) are available, but MVP1 (third example) is unavailable, then video encoder 20 and/or video decoder 30 may be configured to calculate MVP1 as $$\begin{cases} mvp_1^x = \frac{(mvp_2^y - mvp_0^y)}{h}w + mvp_0^x \\ mvp_1^y = -\frac{(mvp_2^x - mvp_0^x)}{h}w + mvp_0^y \end{cases}$$

where MVP2=($mvp_2^x$, $mvp_2^y$), MVP1=($mvp_1^x$, $mvp_1^y$) and MVP0=($mvp_0^x$, $mvp_0^y$), and w and h are the width and height of the current block respectively. In another example, the division operation can be replaced by the shift operation. For example, $$\begin{cases} mvp_1^x = \left(((mvp_2^y - mvp_0^y)w + \text{offset}) >> hb\right) + mvp_0^x \\ mvp_1^y = -\left(((mvp_2^x - mvp_0^x)w + \text{offset}) >> hb\right) + mvp_0^y \end{cases}$$

where h=$2^{wh}$. offset is any integer, such as 0 or h/2. In another example, the division operation can be replaced by a lookup table.

In a seventh example of the disclosure, if MVP1 (third example) and MVP2 (fourth example) are available, but MVP0 (second available) is unavailable, then video encoder 20 and/or video decoder 30 may be configured to calculate MVP1 as $$\begin{cases} mvp_0^x = \frac{(w^2 \times mvp_1^x - w \times h \times mvp_1^y + h^2 \times mvp_2^x + w \times h \times mvp_2^y)}{w^2 + h^2} \\ mvp_0^y = \frac{(w \times h \times mvp_1^x + w^2 \times mvp_1^y - w \times h \times mvp_2^x + h^2 \times mvp_2^y)}{w^2 + h^2} \end{cases}$$

where MVP2=($mvp_2^x$, $mvp_2^y$), MVP1=($mvp_1^x$, $mvp_1^y$) and MVP0=($mvp_0^x$, $mvp_0^y$), and w and h are the width and height of the current block respectively. In another example, the division operation can be replaced by a lookup table.

In an eighth example of the disclosure, video encoder 20 and/or video decoder 30 may be configured to round the output MVP0, MVP1, and MVP2 to a predefined motion precision of the MVD. For example, if the motion storage precision is 1/16 pixel, but the MVD precision is 1/4 pixel, then output MVPs are rounded as

MVP0'=(MVP0>>2)<<2,MVP1'=(MVP1>>2)<<2, MVP3'=(MVP2>>2)<<2

In a ninth example of the disclosure, if an inter-block applies the 6-parameter affine model, then video encoder 20 and/or video decoder 30 may be configured to derive and output MVP0, MVP1, and MVP2 as one affine MVP candidate. If an inter-block applies the 4-parameter affine model, then video encoder 20 and/or video decoder 30 may be configured to only derive and output MVP0, MVP1 as one affine MVP candidate.

In a tenth example of the disclosure, if less than two of MVP0, MVP1 and MVP2 are available, video encoder 20 and/or video decoder 30 may be configured to not output MVP0, MVP1, and MVP2 as one affine MVP candidate.

In an eleventh example of the disclosure, if MVP0 is unavailable, video encoder 20 and/or video decoder 30 may be configured to not output MVP0, MVP1, and MVP2 as one affine MVP candidate.

Figure 9A:
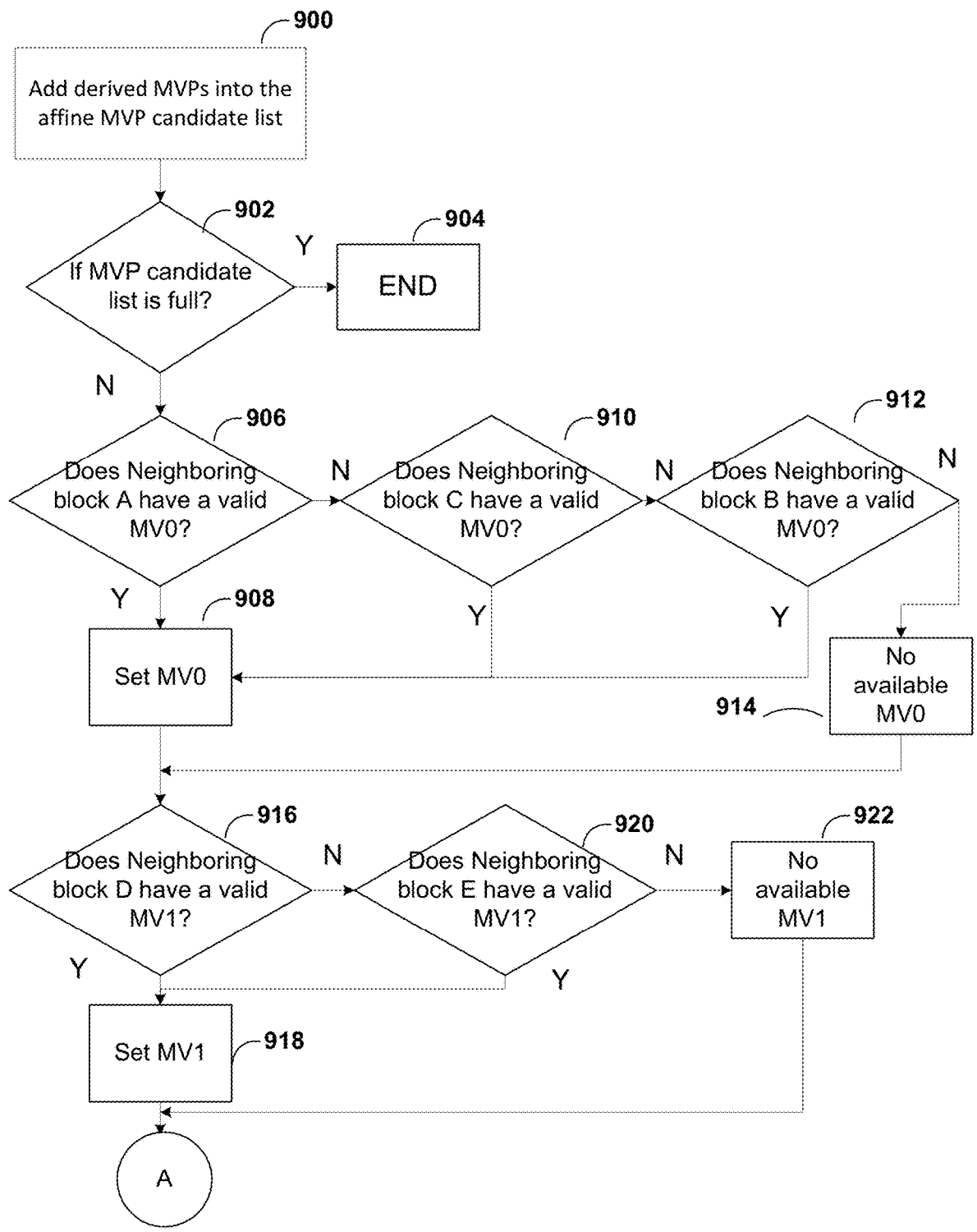
FIGS. 9A and 9B illustrate an exemplary flowchart of a proposed affine motion vector predictor candidate list construction procedure.
Figure 9B:
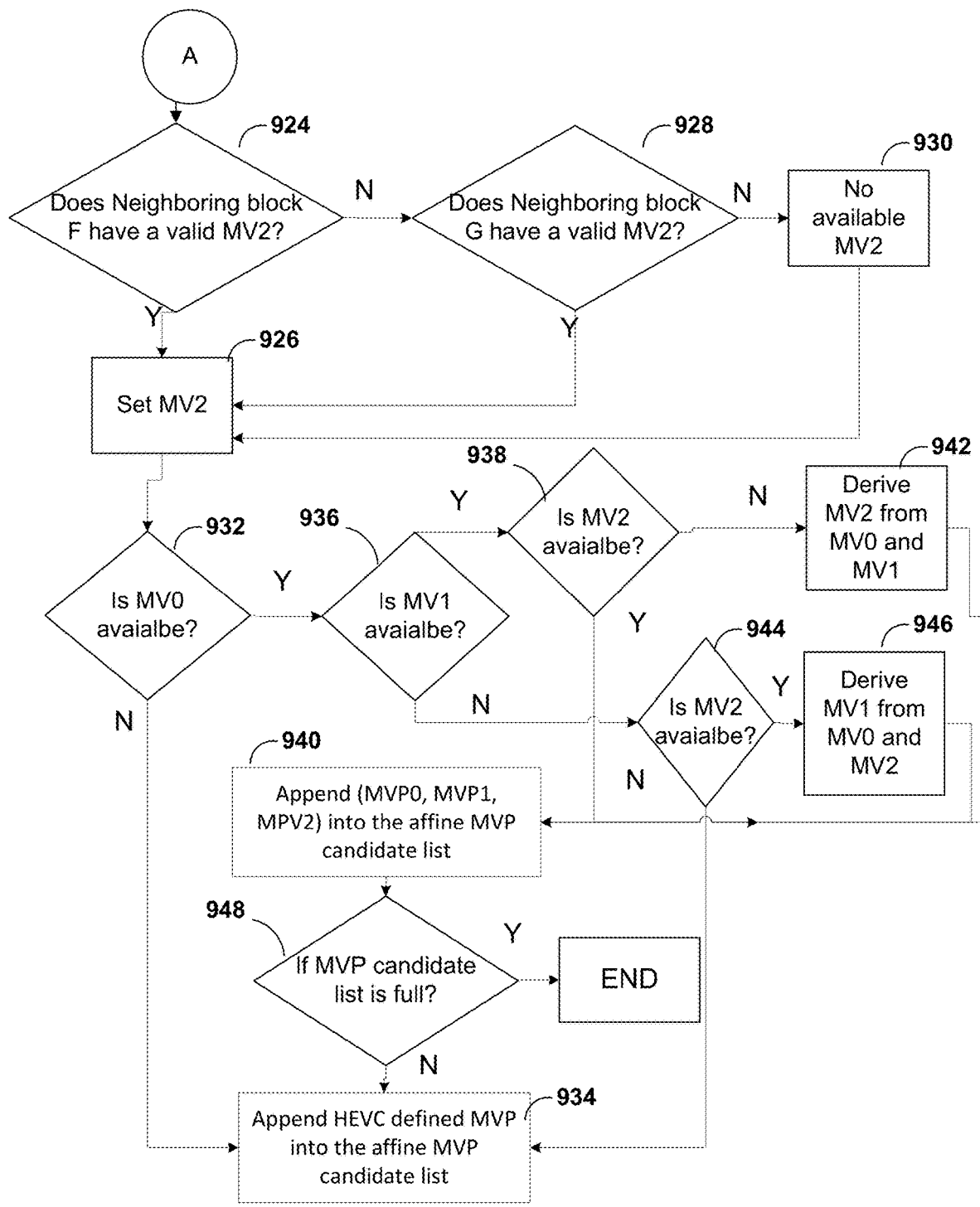

In a twelfth example of the disclosure, FIGS. 9A and 9B illustrate an exemplary flowchart of the proposed affine MVP candidate list construction procedure. In the example described below, a neighbor block has a valid MV in the case that neighboring block has one reference picture, named RefX, identical to the target reference picture.

As shown in FIG. 9A, video encoder 20 and video decoder 30 may first add derived MVPS into the affine MVP candidate list (900). For example, video encoder 20 and video decoder 30 may derive MVPs using any of the prior techniques described above. Video encoder 20 and video decoder 30 may then determine if the MVP candidate list is full (i.e., the MVP candidate list includes a predetermined number of candidates) (902). If yes, the process ends (904). If no, video encoder 20 and video decoder 30 may determine in neighboring block A of FIG. 6 has a valid candidate for MV0 (906). If yes, video encoder 20 and video decoder 30 may set the motion vector of neighboring block A as MV0 (908). If no, video encoder 20 and video decoder 30 may perform the same checks for neighboring block C (910), and then neighboring block B (912). If neighboring block C has a valid candidate for MV0, then video encoder 20 and video decoder 30 may set the motion vector of neighboring block C as MV0 (908). If neighboring block C does not have a valid candidate, video encoder 20 and video decoder 30 may determine if neighboring block B has a valid candidate for MV0 (912). If neighboring block B has a valid candidate for MV0, then video encoder 20 and video decoder 30 may set the motion vector of neighboring block B as MV0 (908). If neighboring block C does not have a valid candidate, video encoder 20 and video decoder 30 may mark MV0 has having no available candidate (914).

The process then proceeds to neighboring blocks D and E of FIG. 6. Video encoder 20 and video decoder 30 first determine if neighboring block D has a valid candidate for MV1 (916). If yes, video encoder 20 and video decoder 30 set the candidate for MV1 as the motion vector of neighboring block D (918). If no, video encoder 20 and video decoder 30 determine if neighboring block E has a valid candidate for MV1 (920). If yes, video encoder 20 and video decoder 30 set the candidate for MV1 as the motion vector of neighboring block E (918). If neighboring block E does not have a valid candidate, video encoder 20 and video decoder 30 may mark MV1 has having no available candidate (922).

The process continues in FIG. 9B, where to neighboring blocks F and G of FIG. 6 are checked. Video encoder 20 and video decoder 30 first determine if neighboring block F has a valid candidate for MV2 (924). If yes, video encoder 20 and video decoder 30 set the candidate for MV2 as the motion vector of neighboring block F (926). If no, video encoder 20 and video decoder 30 determine if neighboring block G has a valid candidate for MV2 (928). If yes, video encoder 20 and video decoder 30 set the candidate for MV2 as the motion vector of neighboring block G (926). If neighboring block G does not have a valid candidate, video encoder 20 and video decoder 30 may mark MV2 has having no available candidate (930).

Next, video encoder 20 and video decoder 30 may determine if a candidate for MV0 was previously-determined to be available (932). If no, video encoder 20 may append additional MVP candidates (e.g., additional HEVC-defined artificial candidates) into the affine MVP candidate list (934). If video encoder 20 and video decoder 30 determine that a candidate for MV0 is available (932), determine that a candidate for MV1 is available (936), and determine that a candidate for MV2 is available (938), video encoder 20 and video decoder 30 may then append the candidates as (MVP0, MVP1, MVP2) into the affine MVP candidate list (940).

If video encoder 20 and video decoder 30 determine that candidates for only MV0 and MV1 are available, video encoder 20 and video decoder 30 may then derive MV2 from the value of the candidates for MV0 and MV1 (942). Video encoder 20 and video decoder 30 may then append the candidates as (MVP0, MVP1, MVP2) into the affine MVP candidate list (940).

If video encoder 20 and video decoder 30 determine that candidates for only MV0 and MV2 are available, video encoder 20 and video decoder 30 may then derive MV1 from the value of the candidates for MV0 and MV2 (946). Video encoder 20 and video decoder 30 may then append the candidates as (MVP0, MVP1, MVP2) into the affine MVP candidate list (940).

After appending the three candidates (MV0, MV1, MV2) as (MVP0, MVP1, MVP2) in the affine MVP candidate list (940), video encoder 20 and video decoder 30 may then recheck if the affine MVP candidate list is full (948). If yes, then process ends. If no, video encoder 20 may append additional MVP candidates (e.g., additional HEVC-defined artificial candidates) into the affine MVP candidate list (934).

The techniques described above for deriving an affine MVP as (MVP0, MVP1, MVP2) may improve the coding efficiency of CPMVs. In examples of this disclosure, the MVPi from a neighboring block has an associated reference picture that is the same as a target reference picture for the current block of video data. Such a technique may reduce or eliminate scaling operations in affine MVP derivation, which simplifies the MVP derivation process. Testing has shown that the techniques of this disclosure lead to simplification of the MVP derivation process with minimal effect on compression performance.

In a thirteenth example of the disclosure, video encoder 20 and/or video decoder 30 may be configured to output the motion vector of the chosen neighboring block which refers to RefX.

In a fourteenth example of the disclosure, if an inter-block applies a 4-parameter affine model, video encoder 20 and/or video decoder 30 may be configured to not signal the MVD1y, which is the vertical component of the motion vector difference of the top-right control point. In another example, a zoom_only_flag is signaled to indicate whether MVD1y is signaled or not. The syntax element zoom_only_flag can be signaled at sequence level such as in Sequence Parameter Set (SPS), at picture level such as in Picture Parameter Set (PPS), at slice level, such as in the slice header, in Coding Tree Unit (CTU) level, Coding Unit (CU) level, or Prediction Unit (PU) level.

1) The zoom_only_flag can be signaled for each reference list within bi-prediction separately. Motions referring to different reference list in a block may have different zoom_only_flag 2) In another example, zoom_only_flag can be signaled once for both reference list within bi-prediction. Motions referring to different reference list in a block share the same zoom_only_flag In a fifteenth example of the disclosure, if MVD1y is not signaled, MV1y is implicitly set equal to MV0y. MV1y is the vertical component of the motion vector of the top-right control point and MV0y is the vertical component of the motion vector of the top-left control point.

Figure 10:
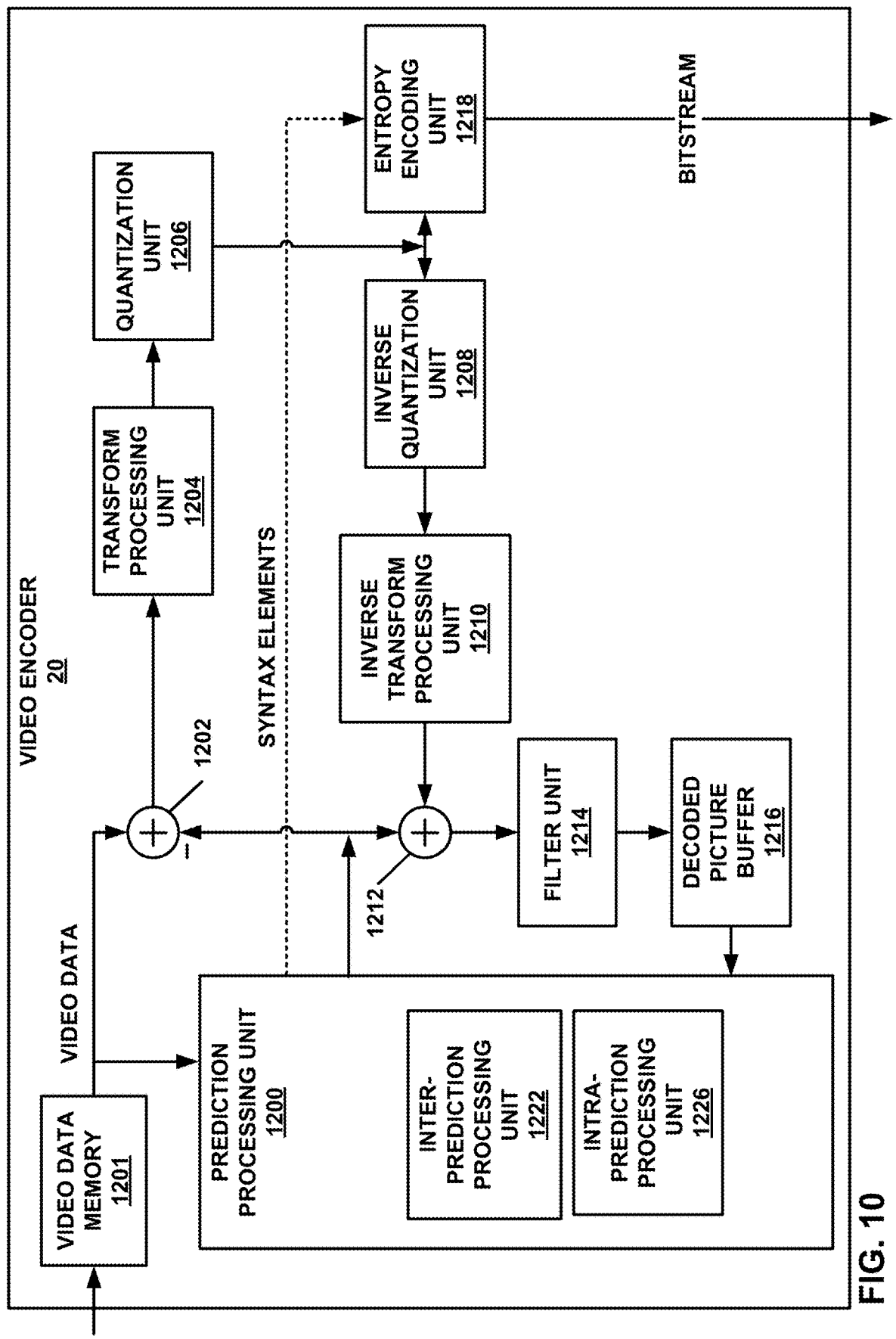
FIG. 10 is a block diagram illustrating an example video encoder that may implement one or more techniques described in this disclosure.

FIG. 10 is a block diagram illustrating an example video encoder 20 that may implement the techniques of this disclosure. FIG. 10 is provided for purposes of explanation and should not be considered limiting of the techniques as broadly exemplified and described in this disclosure. The techniques of this disclosure may be applicable to various coding standards or methods.

In the example of FIG. 10, video encoder 20 includes a prediction processing unit 1200, video data memory 1201, a residual generation unit 1202, a transform processing unit 1204, a quantization unit 1206, an inverse quantization unit 1208, an inverse transform processing unit 1210, a reconstruction unit 1212, a filter unit 1214, a decoded picture buffer 1216, and an entropy encoding unit 1218. Prediction processing unit 1200 includes an inter-prediction processing unit 1220 and an intra-prediction processing unit 1222. Inter-prediction processing unit 1220 may include a motion estimation unit and a motion compensation unit (not shown).

Video data memory 1201 may be configured to store video data to be encoded by the components of video encoder 20. The video data stored in video data memory 1201 may be obtained, for example, from video source 18. Decoded picture buffer 1216 may be a reference picture memory that stores reference video data for use in encoding video data by video encoder 20, e.g., in intra- or inter-coding modes. Video data memory 1201 and decoded picture buffer 1216 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 1201 and decoded picture buffer 1216 may be provided by the same memory device or separate memory devices. In various examples, video data memory 1201 may be on-chip with other components of video encoder 20, or off-chip relative to those components. Video data memory 1201 may be the same as or part of storage media 19 of FIG. 1.

Video encoder 20 receives video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 1200 may perform partitioning to divide the CTBs of the CTU into progressively-smaller blocks. The smaller blocks may be coding blocks of CUs. For example, prediction processing unit 1200 may partition a CTB associated with a CTU according to a tree structure.

Video encoder 20 may encode CUs of a CTU to generate encoded representations of the CUs (i.e., coded CUs). As part of encoding a CU, prediction processing unit 1200 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 1220 may generate predictive data for a PU. As part of generating the predictive data for a PU, inter-prediction processing unit 1220 performs inter prediction on the PU. The predictive data for the PU may include predictive blocks of the PU and motion information for the PU. Inter-prediction processing unit 1220 may perform different operations for a PU of a CU depending on whether the PU is in an I slice, a P slice, or a B slice. In an I slice, all PUs are intra predicted. Hence, if the PU is in an I slice, inter-prediction processing unit 1220 does not perform inter prediction on the PU. Thus, for blocks encoded in I-mode, the predicted block is formed using spatial prediction from previously-encoded neighboring blocks within the same frame. If a PU is in a P slice, inter-prediction processing unit 1220 may use uni-directional inter prediction to generate a predictive block of the PU. If a PU is in a B slice, inter-prediction processing unit 1220 may use uni-directional or bi-directional inter prediction to generate a predictive block of the PU. Inter-prediction processing unit 1220 may apply the techniques for affine motion models as described elsewhere in this disclosure.

Intra-prediction processing unit 1222 may generate predictive data for a PU by performing intra prediction on the PU. The predictive data for the PU may include predictive blocks of the PU and various syntax elements. Intra-prediction processing unit 1222 may perform intra prediction on PUs in I slices, P slices, and B slices.

To perform intra prediction on a PU, intra-prediction processing unit 1222 may use multiple intra prediction modes to generate multiple sets of predictive data for the PU. Intra-prediction processing unit 1222 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 1222 may use various numbers of intra prediction modes, e.g., 33 directional intra prediction modes. In some examples, the number of intra prediction modes may depend on the size of the region associated with the PU.

Prediction processing unit 1200 may select the predictive data for PUs of a CU from among the predictive data generated by inter-prediction processing unit 1220 for the PUs or the predictive data generated by intra-prediction processing unit 1222 for the PUs. In some examples, prediction processing unit 1200 selects the predictive data for the PUs of the CU based on rate/distortion metrics of the sets of predictive data. The predictive blocks of the selected predictive data may be referred to herein as the selected predictive blocks.

Residual generation unit 1202 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 1202 may generate the residual blocks of the CU such that each sample in the residual blocks has a value equal to a difference between a sample in a coding block of the CU and a corresponding sample in a corresponding selected predictive block of a PU of the CU.

Transform processing unit 1204 may perform partition the residual blocks of a CU into transform blocks of TUs of the CU. For instance, transform processing unit 1204 may perform quad-tree partitioning to partition the residual blocks of the CU into transform blocks of TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 1204 may generate transform coefficient blocks for each TU of a CU by applying one or more transforms to the transform blocks of the TU. Transform processing unit 1204 may apply various transforms to a transform block associated with a TU. For example, transform processing unit 1204 may apply a discrete cosine transform (DCT), a directional transform, or a conceptually-similar transform to a transform block. In some examples, transform processing unit 1204 does not apply transforms to a transform block. In such examples, the transform block may be treated as a transform coefficient block.

Quantization unit 1206 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 1206 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 1208 and inverse transform processing unit 1210 may apply inverse quantization and inverse transforms to a coefficient block, respectively, to reconstruct a residual block from the coefficient block. Reconstruction unit 1212 may add the reconstructed residual block to corresponding samples from one or more predictive blocks generated by prediction processing unit 1200 to produce a reconstructed transform block associated with a TU. By reconstructing transform blocks for each TU of a CU in this way, video encoder 20 may reconstruct the coding blocks of the CU.

Filter unit 1214 may perform one or more deblocking operations to reduce blocking artifacts in the coding blocks associated with a CU. Decoded picture buffer 1216 may store the reconstructed coding blocks after filter unit 1214 performs the one or more deblocking operations on the reconstructed coding blocks. Inter-prediction processing unit 1220 may use a reference picture that contains the reconstructed coding blocks to perform inter prediction on PUs of other pictures. In addition, intra-prediction processing unit 1222 may use reconstructed coding blocks in decoded picture buffer 1216 to perform intra prediction on other PUs in the same picture as the CU.

Entropy encoding unit 1218 may receive data from other functional components of video encoder 20. For example, entropy encoding unit 1218 may receive coefficient blocks from quantization unit 1206 and may receive syntax elements from prediction processing unit 1200. Entropy encoding unit 1218 may perform one or more entropy encoding operations on the data to generate entropy-encoded data. For example, entropy encoding unit 1218 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 1218. For instance, the bitstream may include data that represents values of transform coefficients for a CU.

Figure 11:
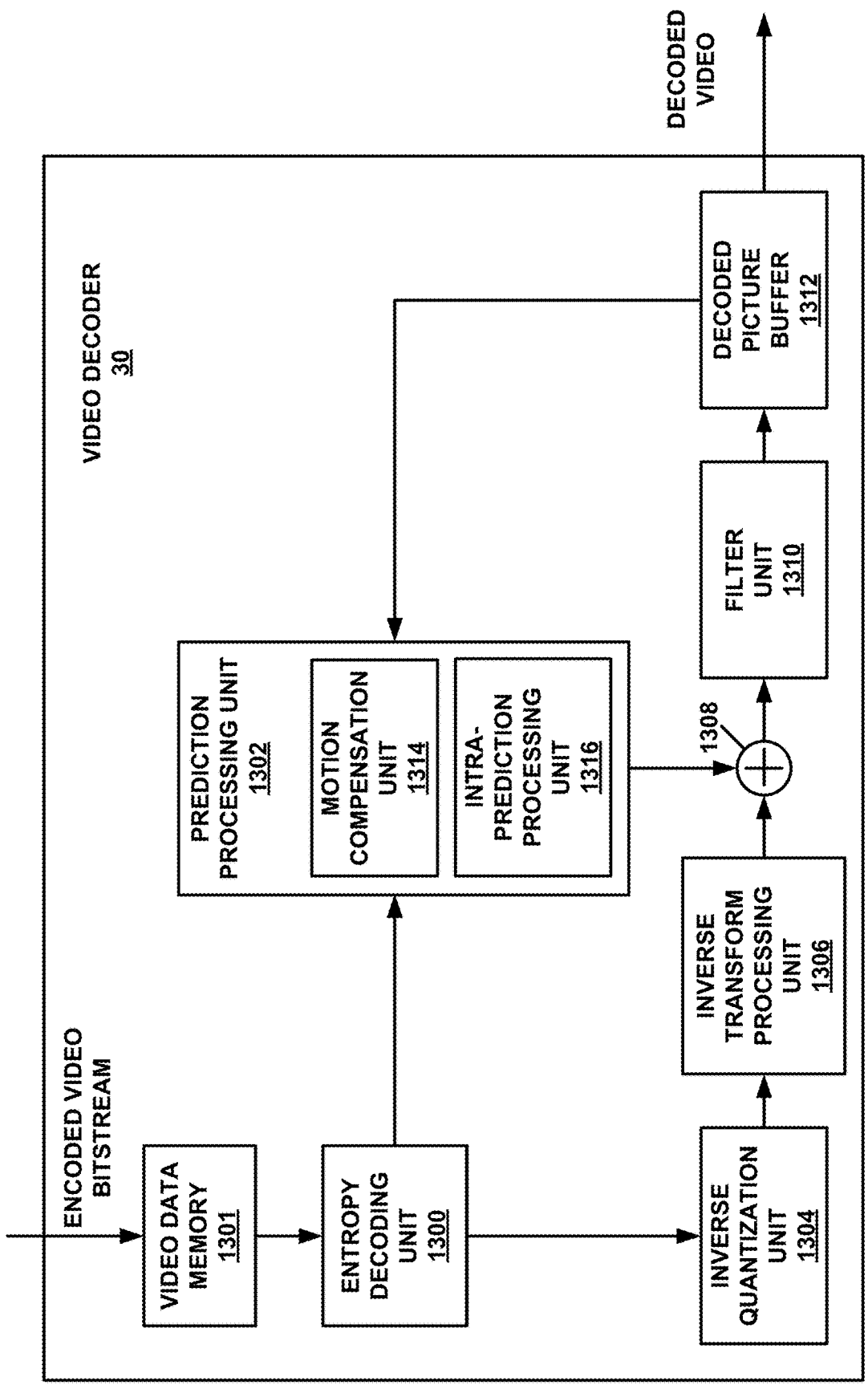
FIG. 11 is a block diagram illustrating an example video decoder that may implement one or more techniques described in this disclosure.

FIG. 11 is a block diagram illustrating an example video decoder 30 that is configured to implement the techniques of this disclosure. FIG. 11 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 11, video decoder 30 includes an entropy decoding unit 1300, video data memory 1301, a prediction processing unit 1302, an inverse quantization unit 1304, an inverse transform processing unit 1306, a reconstruction unit 1308, a filter unit 1310, and a decoded picture buffer 1312. Prediction processing unit 1302 includes a motion compensation unit 1314 and an intra-prediction processing unit 1316. In other examples, video decoder 30 may include more, fewer, or different functional components.

Video data memory 1301 may store encoded video data, such as an encoded video bitstream, to be decoded by the components of video decoder 30. The video data stored in video data memory 1301 may be obtained, for example, from computer-readable medium 16, e.g., from a local video source, such as a camera, via wired or wireless network communication of video data, or by accessing physical data storage media. Video data memory 1301 may form a coded picture buffer (CPB) that stores encoded video data from an encoded video bitstream. Decoded picture buffer 1312 may be a reference picture memory that stores reference video data for use in decoding video data by video decoder 30, e.g., in intra- or inter-coding modes, or for output. Video data memory 1301 and decoded picture buffer 1312 may be formed by any of a variety of memory devices, such as dynamic random-access memory (DRAM), including synchronous DRAM (SDRAM), magnetoresistive RAM (MRAM), resistive RAM (RRAM), or other types of memory devices. Video data memory 1301 and decoded picture buffer 1312 may be provided by the same memory device or separate memory devices. In various examples, video data memory 1301 may be on-chip with other components of video decoder 30, or off-chip relative to those components. Video data memory 1301 may be the same as or part of storage media 28 of FIG. 1.

Video data memory 1301 receives and stores encoded video data (e.g., NAL units) of a bitstream. Entropy decoding unit 1300 may receive encoded video data (e.g., NAL units) from video data memory 1301 and may parse the NAL units to obtain syntax elements. Entropy decoding unit 1300 may entropy decode entropy-encoded syntax elements in the NAL units. Prediction processing unit 1302, inverse quantization unit 1304, inverse transform processing unit 1306, reconstruction unit 1308, and filter unit 1310 may generate decoded video data based on the syntax elements extracted from the bitstream. Entropy decoding unit 1300 may perform a process generally reciprocal to that of entropy encoding unit 1218.

In addition to obtaining syntax elements from the bitstream, video decoder 30 may perform a reconstruction operation on a CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 1304 may inverse quantize, i.e., de-quantize, coefficient blocks associated with the TU. After inverse quantization unit 1304 inverse quantizes a coefficient block, inverse transform processing unit 1306 may apply one or more inverse transforms to the coefficient block in order to generate a residual block associated with the TU. For example, inverse transform processing unit 1306 may apply an inverse DCT, an inverse integer transform, an inverse Karhunen-Loeve transform (KLT), an inverse rotational transform, an inverse directional transform, or another inverse transform to the coefficient block.

Inverse quantization unit 1304 may perform particular techniques of this disclosure. For example, for at least one respective quantization group of a plurality of quantization groups within a CTB of a CTU of a picture of the video data, inverse quantization unit 1304 may derive, based at least in part on local quantization information signaled in the bitstream, a respective quantization parameter for the respective quantization group. Additionally, in this example, inverse quantization unit 1304 may inverse quantize, based on the respective quantization parameter for the respective quantization group, at least one transform coefficient of a transform block of a TU of a CU of the CTU. In this example, the respective quantization group is defined as a group of successive, in coding order, CUs or coding blocks so that boundaries of the respective quantization group must be boundaries of the CUs or coding blocks and a size of the respective quantization group is greater than or equal to a threshold. Video decoder 30 (e.g., inverse transform processing unit 1306, reconstruction unit 1308, and filter unit 1310) may reconstruct, based on inverse quantized transform coefficients of the transform block, a coding block of the CU.

If a PU is encoded using intra prediction, intra-prediction processing unit 1316 may perform intra prediction to generate predictive blocks of the PU. Intra-prediction processing unit 1316 may use an intra prediction mode to generate the predictive blocks of the PU based on samples spatially-neighboring blocks. Intra-prediction processing unit 1316 may determine the intra prediction mode for the PU based on one or more syntax elements obtained from the bitstream.

If a PU is encoded using inter prediction, motion compensation unit 1314 may determine motion information for the PU. Motion compensation unit 1314 may determine, based on the motion information of the PU, one or more reference blocks. Motion compensation unit 1314 may generate, based on the one or more reference blocks, predictive blocks (e.g., predictive luma, Cb and Cr blocks) for the PU. Motion compensation unit 1314 may apply the techniques for affine motion models as described elsewhere in this disclosure.

Reconstruction unit 1308 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 1308 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 1310 may perform a deblocking operation to reduce blocking artifacts associated with the coding blocks of the CU. Video decoder 30 may store the coding blocks of the CU in decoded picture buffer 1312. Decoded picture buffer 1312 may provide reference pictures for subsequent motion compensation, intra prediction, and presentation on a display device, such as display device 32 of FIG. 1. For instance, video decoder 30 may perform, based on the blocks in decoded picture buffer 1312, intra prediction or inter prediction operations for PUs of other CUs.

Figure 12:
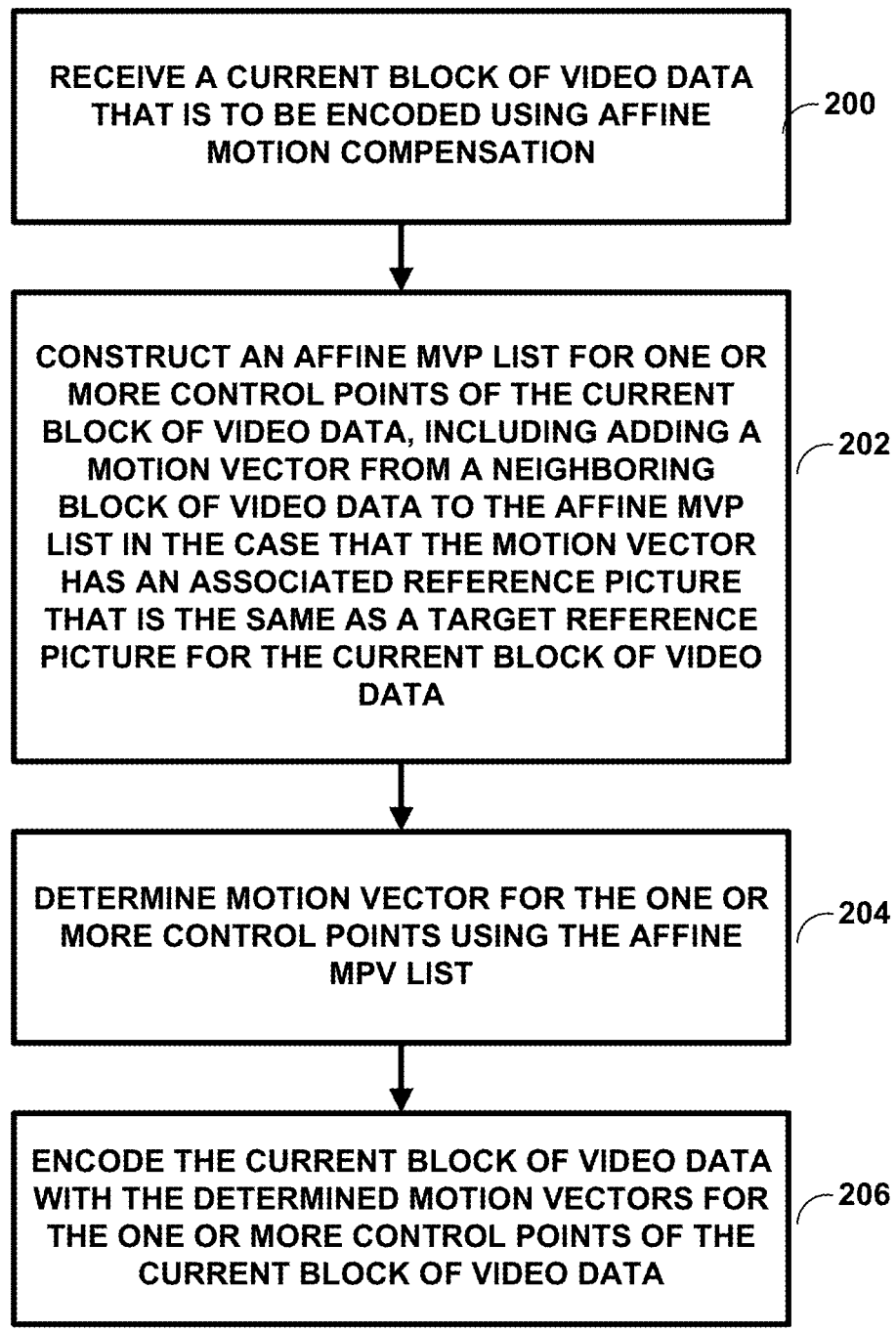
FIG. 12 is a flowchart illustrating an example encoding method of the disclosure.

FIG. 12 is a flowchart illustrating an example encoding method of the disclosure. The techniques of FIG. 12 may be performed by one or more structural components of video encoder 20, including inter-prediction processing unit 1222.

In one example of the disclosure, video encoder 20 may be configured to receive the current block of video data that is to be encoded using affine motion compensation (200), and construct an affine MVP list for one or more control points of the current block of video data, including adding a motion vector from a neighboring block of video data to the affine MVP list in the case that the motion vector has an associated reference picture that is the same as a target reference picture for the current block of video data (202). Video encoder 20 may be further configured to determine motion vectors for the one or more control points using the affine MVP list (204), and encode the current block of video data with the determined motion vectors for the one or more control points of the current block of video data (206).

In one example, the one or more control points include at least a first control point. To construct the affine MVP list for the first control point, video encoder 20 is further configured to check first neighboring blocks of the first control point in a first predetermined order, wherein the first neighboring blocks include a left-above neighboring block (A), a first above neighboring block (B), and a first left neighboring block (C), and wherein the first predetermined order is A then C then B, and add to the affine MVP list, as a first motion vector predictor (MVP0), a first motion vector of the first neighboring blocks having the associated reference picture that is the same as the target reference picture that occurs first in the first predetermined order.

In another example of the disclosure, video encoder 20 is further configured to mark the first motion vector predictor for the first control point as unavailable if no motion vectors of the first neighboring blocks of the first control point have the associated reference picture that is the same as the target reference picture.

In another example of the disclosure, the one or more control points further include a second control point. To construct the affine MVP list for the second control point, video encoder 20 is further configured to check second neighboring blocks of the second control point in a second predetermined order, wherein the second neighboring blocks include a second above neighboring block (D), and a right-above neighboring block (E), and wherein the second predetermined order is D then E, and add to the affine MVP list, as a second motion vector predictor (MVP1), a second motion vector of the second neighboring blocks having the associated reference picture that is the same as the target reference picture that occurs first in the second predetermined order.

In another example of the disclosure, video encoder 20 is further configured to mark the second motion vector predictor for second first control point as unavailable if no motion vectors of the second neighboring blocks of the second control point have the associated reference picture that is the same as the target reference picture.

In another example of the disclosure, the one or more control points further include a third control point. To construct the affine MVP list for the third control point, video encoder 20 is further configured to check third neighboring blocks of the third control point in a third predetermined order, wherein the third neighboring blocks include a second left neighboring block (F), and a left-below neighboring block (G), and wherein the third predetermined order is F then G, and add to the affine MVP list, as a third motion vector predictor (MVP2), a third motion vector of the third neighboring blocks having the associated reference picture that is the same as the target reference picture that occurs first in the third predetermined order.

In another example of the disclosure, video encoder 20 is further configured to mark the third motion vector predictor for third first control point as unavailable if no motion vectors of the third neighboring blocks of the third control point have the associated reference picture that is the same as the target reference picture.

In another example of the disclosure, video encoder 20 is further configured to determine that the third motion vector predictor (MVP2) is unavailable, and calculate the third motion vector predictor (MVP2) as a function of the first motion vector predictor (MVP0) and the second motion vector predictor (MVP1) in response to determining that the third motion vector predictor (MVP2) is unavailable.

In another example of the disclosure, video encoder 20 is further configured to determine that the second motion vector predictor (MVP1) is unavailable, and calculate the second motion vector predictor (MVP1) as a function of the first motion vector predictor (MVP0) and the third motion vector predictor (MVP2) in response to determining that the second motion vector predictor (MVP1) is unavailable.

In another example of the disclosure, video encoder 20 is further configured to determine that the first motion vector predictor (MVP0) is unavailable, and calculate the first motion vector predictor (MVP0) as a function of the second motion vector predictor (MVP1) and the third motion vector predictor (MVP2) in response to determining that the first motion vector predictor (MVP0) is unavailable.

In another example of the disclosure, video encoder 20 is further configured to round the first motion vector predictor (MVP0), the second motion vector predictor (MVP1), and the third motion vector predictor (MVP2) to a predefined motion precision.

In another example of the disclosure, the affine motion compensation is a 6-paramter affine model, and the affine MVP list includes a first motion vector predictor (MVP0), a second motion vector predictor (MVP1), and the third motion vector predictor (MVP2) as a single MVP candidate.

In another example of the disclosure, the affine motion compensation is a 4-paramter affine model, and the affine MVP list includes a first motion vector predictor (MVP0), and a second motion vector predictor (MVP1) as a single MVP candidate.

In another example of the disclosure, the associated reference picture is the same as the target reference picture for the current block of video data when the associated reference picture is in the same reference picture list as the target reference picture and has the same reference index as the target reference picture.

In another example of the disclosure, the associated reference picture is the same as the target reference picture for the current block of video data when the associated reference picture has the same picture order count number as the target reference picture.

Figure 13:
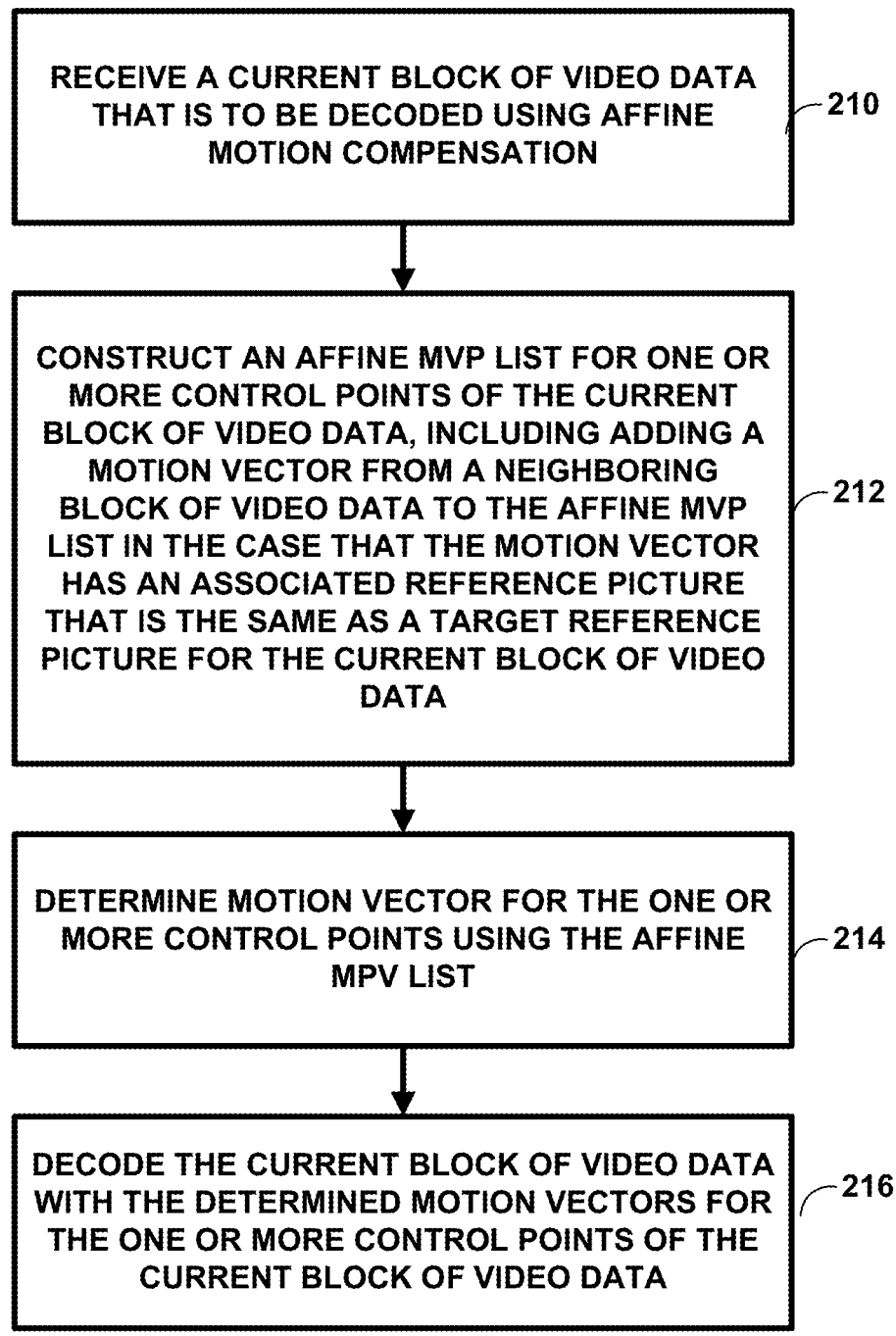
FIG. 13 is a flowchart illustrating an example decoding method of the disclosure.

FIG. 13 is a flowchart illustrating an example decoding method of the disclosure. The techniques of FIG. 13 may be performed by one or more structural components of video decoder 30, including motion compensation unit 1314.

In one example of the disclosure, video decoder 30 may be configured to receive the current block of video data that is to be decoded using affine motion compensation (210), and construct an affine MVP list for one or more control points of the current block of video data, including adding a motion vector from a neighboring block of video data to the affine MVP list in the case that the motion vector has an associated reference picture that is the same as a target reference picture for the current block of video data (212). Video decoder 30 may be further configured to determine motion vectors for the one or more control points using the affine MVP list (214), and decode the current block of video data with the determined motion vectors for the one or more control points of the current block of video data (216).

In one example, the one or more control points include at least a first control point. To construct the affine MVP list for the first control point, video decoder 30 is further configured to check first neighboring blocks of the first control point in a first predetermined order, wherein the first neighboring blocks include a left-above neighboring block (A), a first above neighboring block (B), and a first left neighboring block (C), and wherein the first predetermined order is A then C then B, and add to the affine MVP list, as a first motion vector predictor (MVP0), a first motion vector of the first neighboring blocks having the associated reference picture that is the same as the target reference picture that occurs first in the first predetermined order.

In another example of the disclosure, video decoder 30 is further configured to mark the first motion vector predictor for the first control point as unavailable if no motion vectors of the first neighboring blocks of the first control point have the associated reference picture that is the same as the target reference picture.

In another example of the disclosure, the one or more control points further include a second control point. To construct the affine MVP list for the second control point, video decoder 30 is further configured to check second neighboring blocks of the second control point in a second predetermined order, wherein the second neighboring blocks include a second above neighboring block (D), and a right-above neighboring block (E), and wherein the second predetermined order is D then E, and add to the affine MVP list, as a second motion vector predictor (MVP1), a second motion vector of the second neighboring blocks having the associated reference picture that is the same as the target reference picture that occurs first in the second predetermined order.

In another example of the disclosure, video decoder 30 is further configured to mark the second motion vector predictor for second first control point as unavailable if no motion vectors of the second neighboring blocks of the second control point have the associated reference picture that is the same as the target reference picture.

In another example of the disclosure, the one or more control points further include a third control point. To construct the affine MVP list for the third control point, video decoder 30 is further configured to check third neighboring blocks of the third control point in a third predetermined order, wherein the third neighboring blocks include a second left neighboring block (F), and a left-below neighboring block (G), and wherein the third predetermined order is F then G, and add to the affine MVP list, as a third motion vector predictor (MVP2), a third motion vector of the third neighboring blocks having the associated reference picture that is the same as the target reference picture that occurs first in the third predetermined order.

In another example of the disclosure, video decoder 30 is further configured to mark the third motion vector predictor for third first control point as unavailable if no motion vectors of the third neighboring blocks of the third control point have the associated reference picture that is the same as the target reference picture.

In another example of the disclosure, video decoder 30 is further configured to determine that the third motion vector predictor (MVP2) is unavailable, and calculate the third motion vector predictor (MVP2) as a function of the first motion vector predictor (MVP0) and the second motion vector predictor (MVP1) in response to determining that the third motion vector predictor (MVP2) is unavailable.

In another example of the disclosure, video decoder 30 is further configured to determine that the second motion vector predictor (MVP1) is unavailable, and calculate the second motion vector predictor (MVP1) as a function of the first motion vector predictor (MVP0) and the third motion vector predictor (MVP2) in response to determining that the second motion vector predictor (MVP1) is unavailable.

In another example of the disclosure, video decoder 30 is further configured to determine that the first motion vector predictor (MVP0) is unavailable, and calculate the first motion vector predictor (MVP0) as a function of the second motion vector predictor (MVP1) and the third motion vector predictor (MVP2) in response to determining that the first motion vector predictor (MVP0) is unavailable.

In another example of the disclosure, video decoder 30 is further configured to round the first motion vector predictor (MVP0), the second motion vector predictor (MVP1), and the third motion vector predictor (MVP2) to a predefined motion precision.

In another example of the disclosure, the affine motion compensation is a 6-paramter affine model, and the affine MVP list includes a first motion vector predictor (MVP0), a second motion vector predictor (MVP1), and the third motion vector predictor (MVP2) as a single MVP candidate.

In another example of the disclosure, the affine motion compensation is a 4-paramter affine model, and the affine MVP list includes a first motion vector predictor (MVP0), and a second motion vector predictor (MVP1) as a single MVP candidate.

In another example of the disclosure, the associated reference picture is the same as the target reference picture for the current block of video data when the associated reference picture is in the same reference picture list as the target reference picture and has the same reference index as the target reference picture.

In another example of the disclosure, the associated reference picture is the same as the target reference picture for the current block of video data when the associated reference picture has the same picture order count number as the target reference picture.

Certain aspects of this disclosure have been described with respect to HEVC, extensions of the HEVC standard, JEM, and VVC for purposes of illustration. However, the techniques described in this disclosure may be useful for other video coding processes, including other standard or proprietary video coding processes presently under development or not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality described herein may be provided within dedicated hardware and/or software modules configured for encoding and decoding or incorporated in a combined codec. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of video decoding, the method comprising:
receiving a current block of video data that is to be decoded using affine motion compensation;
constructing an affine motion vector predictor (MVP) list for a plurality of control points of an affine model used to code the current block of video data, including adding a motion vector from a neighboring block of video data to the affine MVP list as a motion vector predictor based on the motion vector having an associated reference picture that is the same as a target reference picture for the current block of video data, and refraining from adding the motion vector from the neighboring block of video data to the affine MVP list as a motion vector predictor based on the motion vector not having the associated reference picture that is the same as the target reference picture for the current block of video data,
wherein constructing the affine MVP list further comprises deriving a single candidate from a plurality of motion vector predictors, wherein the plurality of motion vector predictors includes a first motion vector predictor (MVP0), a second motion vector predictor (MVP1), and a third motion vector predictor (MVP2) based on the affine model being a 6-parameter affine model, and wherein the plurality of motion vector predictors includes the first motion vector predictor (MVP0) and the second motion vector predictor (MVP1) based on the affine model being a 4-parameter affine model;
determining motion vectors for the plurality of control points using the affine MVP list; and
decoding the current block of video data with the determined motion vectors for the plurality of control points of the current block of video data.

2. The method of claim 1, wherein the plurality of control points include at least a first control point, and wherein constructing the affine MVP list for the first control point comprises:
checking first neighboring blocks of the first control point in a first predetermined order, wherein the first neighboring blocks include a left-above neighboring block (A), a first above neighboring block (B), and a first left neighboring block (C), and wherein the first predetermined order is A then C then B; and
adding to the affine MVP list, as the first motion vector predictor (MVP0), a first motion vector of the first neighboring blocks having the associated reference picture that is the same as the target reference picture that occurs first in the first predetermined order.

3. The method of claim 2, further comprising:
marking the first motion vector predictor for the first control point as unavailable if no motion vectors of the first neighboring blocks of the first control point have the associated reference picture that is the same as the target reference picture.

4. The method of claim 2, wherein the plurality of control points further include a second control point, and wherein constructing the affine MVP list for the second control point comprises:
checking second neighboring blocks of the second control point in a second predetermined order, wherein the second neighboring blocks include a second above neighboring block (D), and a right-above neighboring block (E), and wherein the second predetermined order is D then E; and
adding to the affine MVP list, as the second motion vector predictor (MVP1), a second motion vector of the second neighboring blocks having the associated reference picture that is the same as the target reference picture that occurs first in the second predetermined order.

5. The method of claim 4, further comprising:
marking the second motion vector predictor for second first control point as unavailable if no motion vectors of the second neighboring blocks of the second control point have the associated reference picture that is the same as the target reference picture.

6. The method of claim 4, wherein the plurality of control points further include a third control point, and wherein constructing the affine MVP list for the third control point comprises:
checking third neighboring blocks of the third control point in a third predetermined order, wherein the third neighboring blocks include a second left neighboring block (F), and a left-below neighboring block (G), and wherein the third predetermined order is F then G; and
adding to the affine MVP list, as the third motion vector predictor (MVP2), a third motion vector of the third neighboring blocks having the associated reference picture that is the same as the target reference picture that occurs first in the third predetermined order.

7. The method of claim 6, further comprising:
marking the third motion vector predictor for third first control point as unavailable if no motion vectors of the third neighboring blocks of the third control point have the associated reference picture that is the same as the target reference picture.

8. The method of claim 6, further comprising:
determining that the third motion vector predictor (MVP2) is unavailable; and
calculating the third motion vector predictor (MVP2) as a function of the first motion vector predictor (MVP0) and the second motion vector predictor (MVP1) in response to determining that the third motion vector predictor (MVP2) is unavailable.

9. The method of claim 6, further comprising:
determining that the second motion vector predictor (MVP1) is unavailable; and
calculating the second motion vector predictor (MVP1) as a function of the first motion vector predictor (MVP0) and the third motion vector predictor (MVP2) in response to determining that the second motion vector predictor (MVP1) is unavailable.

10. The method of claim 6, further comprising:
determining that the first motion vector predictor (MVP0) is unavailable; and
calculating the first motion vector predictor (MVP0) as a function of the second motion vector predictor (MVP1) and the third motion vector predictor (MVP2) in response to determining that the first motion vector predictor (MVP0) is unavailable.

11. The method of claim 6, further comprising:
rounding the first motion vector predictor (MVP0), the second motion vector predictor (MVP1), and the third motion vector predictor (MVP2) to a predefined motion precision.

12. The method of claim 1, wherein the associated reference picture is the same as the target reference picture for the current block of video data when the associated reference picture is in the same reference picture list as the target reference picture and has the same reference index as the target reference picture.

13. The method of claim 1, wherein the associated reference picture is the same as the target reference picture for the current block of video data when the associated reference picture has the same picture order count number as the target reference picture.

14. An apparatus configured to decode video data, the apparatus comprising:
a memory configured to store a current block of video data; and
one or more processors in communication with the memory, wherein the apparatus is configured to:
receive the current block of video data that is to be decoded using affine motion compensation;
construct an affine motion vector predictor (MVP) list for a plurality of control points of an affine model used to code the current block of video data, including adding a motion vector from a neighboring block of video data to the affine MVP list as a motion vector predictor based on the motion vector having an associated reference picture that is the same as a target reference picture for the current block of video data, and refraining from adding the motion vector from the neighboring block of video data to the affine MVP list as a motion vector predictor based on the motion vector not having the associated reference picture that is the same as the target reference picture for the current block of video data,
wherein to construct the affine MVP list, the apparatus is further configured to derive a single candidate from a plurality of motion vector predictors, wherein the plurality of motion vector predictors includes a first motion vector predictor (MVP0), a second motion vector predictor (MVP1), and a third motion vector predictor (MVP2) based on the affine model being a 6-parameter affine model, and wherein the plurality of motion vector predictors includes the first motion vector predictor (MVP0) and the second motion vector predictor (MVP1) based on the affine model being a 4-parameter affine model;
determine motion vectors for the plurality of control points using the affine MVP list; and
decode the current block of video data with the determined motion vectors for the plurality of control points of the current block of video data.

15. The apparatus of claim 14, wherein the plurality of control points include at least a first control point, and wherein to construct the affine MVP list for the first control point, the apparatus is further configured to:
check first neighboring blocks of the first control point in a first predetermined order, wherein the first neighboring blocks include a left-above neighboring block (A), a first above neighboring block (B), and a first left neighboring block (C), and wherein the first predetermined order is A then C then B; and
add to the affine MVP list, as the first motion vector predictor (MVP0), a first motion vector of the first neighboring blocks having the associated reference picture that is the same as the target reference picture that occurs first in the first predetermined order.

16. The apparatus of claim 15, wherein the apparatus is further configured to:
mark the first motion vector predictor for the first control point as unavailable if no motion vectors of the first neighboring blocks of the first control point have the associated reference picture that is the same as the target reference picture.

17. The apparatus of claim 15, wherein the plurality of control points further include a second control point, and wherein to construct the affine MVP list for the second control point, the apparatus is further configured to:
check second neighboring blocks of the second control point in a second predetermined order, wherein the second neighboring blocks include a second above neighboring block (D), and a right-above neighboring block (E), and wherein the second predetermined order is D then E; and
add to the affine MVP list, as the second motion vector predictor (MVP1), a second motion vector of the second neighboring blocks having the associated reference picture that is the same as the target reference picture that occurs first in the second predetermined order.

18. The apparatus of claim 17, wherein the apparatus is further configured to:
mark the second motion vector predictor for second first control point as unavailable if no motion vectors of the second neighboring blocks of the second control point have the associated reference picture that is the same as the target reference picture.

19. The apparatus of claim 17, wherein the plurality of control points further include a third control point, and wherein to construct the affine MVP list for the third control point, the apparatus is further configured to:
check third neighboring blocks of the third control point in a third predetermined order, wherein the third neighboring blocks include a second left neighboring block (F), and a left-below neighboring block (G), and wherein the third predetermined order is F then G; and
add to the affine MVP list, as the third motion vector predictor (MVP2), a third motion vector of the third neighboring blocks having the associated reference picture that is the same as the target reference picture that occurs first in the third predetermined order.

20. The apparatus of claim 19, wherein the apparatus is further configured to:
mark the third motion vector predictor for third first control point as unavailable if no motion vectors of the third neighboring blocks of the third control point have the associated reference picture that is the same as the target reference picture.

21. The apparatus of claim 19, wherein the apparatus is further configured to:
determine that the third motion vector predictor (MVP2) is unavailable; and
calculate the third motion vector predictor (MVP2) as a function of the first motion vector predictor (MVP0) and the second motion vector predictor (MVP1) in response to determining that the third motion vector predictor (MVP2) is unavailable.

22. The apparatus of claim 19, wherein the apparatus is further configured to:
determine that the second motion vector predictor (MVP1) is unavailable; and
calculate the second motion vector predictor (MVP1) as a function of the first motion vector predictor (MVP0) and the third motion vector predictor (MVP2) in response to determining that the second motion vector predictor (MVP1) is unavailable.

23. The apparatus of claim 19, wherein the apparatus is further configured to:
determine that the first motion vector predictor (MVP0) is unavailable; and
calculate the first motion vector predictor (MVP0) as a function of the second motion vector predictor (MVP1)

and the third motion vector predictor (MVP2) in response to determining that the first motion vector predictor (MVP0) is unavailable.

24. The apparatus of claim 19, wherein the apparatus is further configured to:
round the first motion vector predictor (MVP0), the second motion vector predictor (MVP1), and the third motion vector predictor (MVP2) to a predefined motion precision.

25. The apparatus of claim 14, wherein the associated reference picture is the same as the target reference picture for the current block of video data when the associated reference picture is in the same reference picture list as the target reference picture and has the same reference index as the target reference picture.

26. The apparatus of claim 14, wherein the associated reference picture is the same as the target reference picture for the current block of video data when the associated reference picture has the same picture order count number as the target reference picture.

27. An apparatus configured to decode video data, the apparatus comprising:
means for receiving a current block of video data that is to be decoded using affine motion compensation;
means for constructing an affine motion vector predictor (MVP) list for a plurality of control points of an affine model used to code the current block of video data, including adding a motion vector from a neighboring block of video data to the affine MVP list as a motion vector predictor based on the motion vector having an associated reference picture that is the same as a target reference picture for the current block of video data, and refraining from adding the motion vector from the neighboring block of video data to the affine MVP list as a motion vector predictor based on the motion vector not having the associated reference picture that is the same as the target reference picture for the current block of video data,
wherein the means for constructing the affine MVP list further comprises means for deriving a single candidate from a plurality of motion vector predictors, wherein the plurality of motion vector predictors includes a first motion vector predictor (MVP0), a second motion vector predictor (MVP1), and a third motion vector predictor (MVP2) based on the affine model being a 6-parameter affine model, and wherein the plurality of motion vector predictors includes the first motion vector predictor (MVP0) and the second motion vector predictor (MVP1) based on the affine model being a 4-parameter affine model;
means for determining motion vectors for the plurality of control points using the affine MVP list; and
means for decoding the current block of video data with the determined motion vectors for the plurality of control points of the current block of video data.

28. An apparatus configured to encode video data, the apparatus comprising:
a memory configured to store a current block of video data; and
one or more processors in communication with the memory, wherein the apparatus is configured to:
receive the current block of video data that is to be encoded using affine motion compensation;
construct an affine motion vector predictor (MVP) list for a plurality of control points of an affine model used to code the current block of video data, including adding a motion vector from a neighboring block of video data to the affine MVP list as a motion vector predictor based on the motion vector having an associated reference picture that is the same as a target reference picture for the current block of video data, and refraining from adding the motion vector from the neighboring block of video data to the affine MVP list as a motion vector predictor based on the motion vector not having the associated reference picture that is the same as the target reference picture for the current block of video data,
wherein to construct the affine MVP list, the apparatus is further configured to derive a single candidate from a plurality of motion vector predictors, wherein the plurality of motion vector predictors includes a first motion vector predictor (MVP0), a second motion vector predictor (MVP1), and a third motion vector predictor (MVP2) based on the affine model being a 6-parameter affine model, and wherein the plurality of motion vector predictors includes the first motion vector predictor (MVP0) and the second motion vector predictor (MVP1) based on the affine model being a 4-parameter affine model;
determine motion vectors for the plurality of control points using the affine MVP list; and
encode the current block of video data with the determined motion vectors for the plurality of control points of the current block of video data.

29. The apparatus of claim 28, wherein the plurality of control points include at least a first control point, and wherein to construct the affine MVP list for the first control point, the apparatus is further configured to:
check first neighboring blocks of the first control point in a first predetermined order, wherein the first neighboring blocks include a left-above neighboring block (A), a first above neighboring block (B), and a first left neighboring block (C), and wherein the first predetermined order is A then C then B; and
add to the affine MVP list, as the first motion vector predictor (MVP0), a first motion vector of the first neighboring blocks having the associated reference picture that is the same as the target reference picture that occurs first in the first predetermined order.

30. The apparatus of claim 29, wherein the apparatus is further configured to:
mark the first motion vector predictor for the first control point as unavailable if no motion vectors of the first neighboring blocks of the first control point have the associated reference picture that is the same as the target reference picture.

31. The apparatus of claim 29, wherein the plurality of control points further include a second control point, and wherein to construct the affine MVP list for the second control point, the apparatus is further configured to:
check second neighboring blocks of the second control point in a second predetermined order, wherein the second neighboring blocks include a second above neighboring block (D), and a right-above neighboring block (E), and wherein the second predetermined order is D then E; and
add to the affine MVP list, as the second motion vector predictor (MVP1), a second motion vector of the second neighboring blocks having the associated reference picture that is the same as the target reference picture that occurs first in the second predetermined order.

32. The apparatus of claim 31, wherein the apparatus is further configured to:
- mark the second motion vector predictor for second first control point as unavailable if no motion vectors of the second neighboring blocks of the second control point have the associated reference picture that is the same as the target reference picture.

33. The apparatus of claim 31, wherein the plurality of control points further include a third control point, and wherein to construct the affine MVP list for the third control point, the apparatus is further configured to:
- check third neighboring blocks of the third control point in a third predetermined order, wherein the third neighboring blocks include a second left neighboring block (F), and a left-below neighboring block (G), and wherein the third predetermined order is F then G; and
- add to the affine MVP list, as the third motion vector predictor (MVP2), a third motion vector of the third neighboring blocks having the associated reference picture that is the same as the target reference picture that occurs first in the third predetermined order.

34. The apparatus of claim 33, wherein the apparatus is further configured to:
- mark the third motion vector predictor for third first control point as unavailable if no motion vectors of the third neighboring blocks of the third control point have the associated reference picture that is the same as the target reference picture.

35. The apparatus of claim 33, wherein the apparatus is further configured to:
- determine that the third motion vector predictor (MVP2) is unavailable; and
- calculate the third motion vector predictor (MVP2) as a function of the first motion vector predictor (MVP0) and the second motion vector predictor (MVP1) in response to determining that the third motion vector predictor (MVP2) is unavailable.

36. The apparatus of claim 33, wherein the apparatus is further configured to:
- determine that the second motion vector predictor (MVP1) is unavailable; and
- calculate the second motion vector predictor (MVP1) as a function of the first motion vector predictor (MVP0) and the third motion vector predictor (MVP2) in response to determining that the second motion vector predictor (MVP1) is unavailable.

37. The apparatus of claim 33, wherein the apparatus is further configured to:
- determine that the first motion vector predictor (MVP0) is unavailable; and
- calculate the first motion vector predictor (MVP0) as a function of the second motion vector predictor (MVP1) and the third motion vector predictor (MVP2) in response to determining that the first motion vector predictor (MVP0) is unavailable.

38. The apparatus of claim 33, wherein the apparatus is further configured to:
- round the first motion vector predictor (MVP0), the second motion vector predictor (MVP1), and the third motion vector predictor (MVP2) to a predefined motion precision.

39. The apparatus of claim 28, wherein the associated reference picture is the same as the target reference picture for the current block of video data when the associated reference picture is in the same reference picture list as the target reference picture and has the same reference index as the target reference picture.

40. The apparatus of claim 28, wherein the associated reference picture is the same as the target reference picture for the current block of video data when the associated reference picture has the same picture order count number as the target reference picture.

* * * * *